(12) United States Patent
Kim

(10) Patent No.: US 8,514,357 B2
(45) Date of Patent: Aug. 20, 2013

(54) ALIGNMENT MATERIAL, ALIGNMENT LAYER, LIQUID CRYSTAL DISPLAY DEVICE AND MANUFACTURING METHOD THEREOF

(75) Inventor: Jae-Hoon Kim, Yongin-si (KR)

(73) Assignee: Samsung Display Co., Ltd. (KR)

( * ) Notice: Subject to any disclaimer, the term of this patent is extended or adjusted under 35 U.S.C. 154(b) by 419 days.

(21) Appl. No.: 12/738,974

(22) PCT Filed: Sep. 15, 2009

(86) PCT No.: PCT/KR2009/005247
§ 371 (c)(1),
(2), (4) Date: Apr. 20, 2010

(87) PCT Pub. No.: WO2010/032946
PCT Pub. Date: Mar. 25, 2010

(65) Prior Publication Data
US 2010/0208183 A1    Aug. 19, 2010

(30) Foreign Application Priority Data

| | | |
|---|---|---|
| Sep. 17, 2008 | (KR) | 10-2008-0091055 |
| Oct. 31, 2008 | (KR) | 10-2008-0107985 |
| Dec. 29, 2008 | (KR) | 10-2008-0135660 |
| Jan. 5, 2009 | (KR) | 10-2009-0000314 |
| Jan. 5, 2009 | (KR) | 10-2009-0000315 |
| Jan. 23, 2009 | (KR) | 10-2009-0006338 |
| Feb. 19, 2009 | (KR) | 10-2009-0013805 |
| Feb. 19, 2009 | (KR) | 10-2009-0013929 |
| Mar. 18, 2009 | (KR) | 10-2009-0023199 |
| Mar. 19, 2009 | (KR) | 10-2009-0023676 |
| Apr. 7, 2009 | (KR) | 10-2009-0030068 |
| May 15, 2009 | (KR) | 10-2009-0042842 |
| May 15, 2009 | (KR) | 10-2009-0042843 |
| May 15, 2009 | (KR) | 10-2009-0042855 |
| May 15, 2009 | (KR) | 10-2009-0042856 |
| May 19, 2009 | (KR) | 10-2009-0043702 |
| May 29, 2009 | (KR) | 10-2009-0047851 |
| Sep. 15, 2009 | (KR) | 10-2009-0087024 |
| Sep. 15, 2009 | (KR) | 10-2009-0087083 |

(51) Int. Cl.
*G02F 1/1337* (2006.01)

(52) U.S. Cl.
USPC .......................................... 349/124; 349/127

(58) Field of Classification Search
USPC .................................. 349/124, 127
See application file for complete search history.

(56) References Cited

U.S. PATENT DOCUMENTS 5,786,041 A * 7/1998 Takenaka et al. .............. 428/1.2
6,128,058 A * 10/2000 Walton .......................... 349/129

(Continued)

FOREIGN PATENT DOCUMENTS

CN    1646662    7/2005
CN    101206365    6/2008

(Continued)

OTHER PUBLICATIONS

Hitachi Ltd, Liquid Crystal Display Device, Apr. 28, 2000, Machine translation of JP 2000-122066 A from Patent Abstracts of Japan Website, pp. 1-28.*

(Continued)

*Primary Examiner* — Edward Glick
*Assistant Examiner* — Dennis Y Kim
(74) *Attorney, Agent, or Firm* — Innovation Counsel LLP

(57) ABSTRACT

A liquid crystal display device and a method for manufacturing the same are disclosed. In an embodiment of the present invention, a liquid crystal display device and a method of manufacturing the liquid crystal display device includes a first substrate that has a first electrode formed thereon, a second substrate that faces the first substrate, a liquid crystal layer that is formed between the first substrate and the second substrate, and a first alignment layer that is formed on the first substrate and is in contact with the liquid crystal layer. Here, the first alignment layer includes a first alignment base layer that is photoaligned, and a first alignment controlling layer that is extended from the inside of the first alignment base layer.

18 Claims, 35 Drawing Sheets

(56) References Cited

U.S. PATENT DOCUMENTS

| | | | |
|---|---|---|---|
| 6,191,836 B1* | 2/2001 | Woo et al. | 349/124 |
| 6,512,569 B1* | 1/2003 | Acosta et al. | 349/181 |
| 6,696,114 B1* | 2/2004 | Kawatsuki et al. | 428/1.2 |
| 7,294,369 B2 | 11/2007 | Harding et al. | |
| 7,326,449 B2* | 2/2008 | Geisow et al. | 428/1.2 |
| 7,929,091 B2* | 4/2011 | Shin et al. | 349/124 |
| 8,178,288 B2* | 5/2012 | Yen et al. | 430/321 |
| 8,345,201 B2* | 1/2013 | Mizusaki et al. | 349/135 |
| 2003/0203130 A1 | 10/2003 | Geisow et al. | |
| 2004/0169806 A1 | 9/2004 | Takeda et al. | |
| 2005/0162596 A1 | 7/2005 | Kim et al. | |
| 2006/0050209 A1 | 3/2006 | Higa | |
| 2006/0139537 A1 | 6/2006 | Park et al. | |
| 2006/0152660 A1 | 7/2006 | Tanaka et al. | |
| 2007/0024786 A1 | 2/2007 | Tanaka et al. | |
| 2007/0109466 A1 | 5/2007 | Choi et al. | |
| 2008/0062354 A1* | 3/2008 | Ho et al. | 349/86 |
| 2008/0106689 A1* | 5/2008 | Inoue et al. | 349/181 |
| 2008/0151145 A1* | 6/2008 | Kumazawa et al. | 349/84 |
| 2008/0160222 A1 | 7/2008 | Harding et al. | |
| 2008/0179565 A1 | 7/2008 | Hsieh et al. | |
| 2008/0212015 A1 | 9/2008 | Chan et al. | |
| 2011/0128486 A1* | 6/2011 | Kim | 349/123 |
| 2011/0128487 A1* | 6/2011 | Kim | 349/123 |

FOREIGN PATENT DOCUMENTS

| | | | |
|---|---|---|---|
| EP | 1498468 A1 | | 1/2005 |
| EP | 2352061 A1 | | 8/2011 |
| JP | 10-039308 A | | 2/1998 |
| JP | 10-268318 A | | 10/1998 |
| JP | 2000122066 A | * | 4/2000 |
| JP | 2006-171304 A | | 6/2006 |
| KR | 10-2006-0018401 A | | 3/2006 |
| WO | 95/034843 A | | 12/1995 |
| WO | WO 2010047011 A1 | * | 4/2010 |

OTHER PUBLICATIONS

Fujitsu Display Tech Merck Pat, Liquid Crystal Display Device, Jul. 27, 2011, Machine Translation of CN1646662B from Global Patent Search Network, pp. 1-5.*

Sony Corp, Liquid Crystal Display Device and Method of Manufacturing the Same, Jun. 25, 2008, Machine Translation of CN101206365A from Global Patent Search Network, pp. 1-8.*

European Search Report corresponding to EP 09814762.2, Feb. 17, 2012, 9 pages.

European Search Report corresponding to EP 09814778.8, Mar. 2, 2012, 12 pages.

International Search Report for PCT/KR2009/005278 dated Mar. 22, 2010 (4 pages).

Written Opinion of the International Searching Authority for PCT/KR 2009/005278 dated Mar. 22, 2010 (3 pages).

International Search Report for PCT/KR2009/005247 dated Apr. 27, 2010 (3 pages).

Written Opinion of the International Searching Authority for PCT/KR 2009/005247 dated Apr. 27, 2010 (5 pages).

* cited by examiner

→ First Direction
← Second Direction

ALIGNMENT MATERIAL, ALIGNMENT LAYER, LIQUID CRYSTAL DISPLAY DEVICE AND MANUFACTURING METHOD THEREOF

RELATED APPLICATIONS

This application claims priority of International Patent Corporation Treaty Application No. PCT/KR2009/005247 filed on Sep. 15, 2009, which claims priority of Korean Patent Application No. 10-2008-0091005 filed Sep. 17, 2008, Korean Patent Application No. 10-2008-0107985 filed Oct. 31, 2008, Korean Patent Application No. 10-2008-0135660 filed Dec. 29, 2008, Korean Patent Application No. 10-2009-0000314 filed Jan. 5, 2009, Korean Patent Application No. 10-2009-0000315 filed Jan. 5, 2009, Korean Patent Application No. 10-2009-0006338 filed Jan. 23, 2009, Korean Patent Application No. 10-2009-0013929 filed Feb. 19, 2009, Korean Patent Application No. 10-2009-0013805 filed Feb. 19, 2009, Korean Patent Application No. 10-2009-0023199 filed Mar. 18, 2009, Korean Patent Application No. 10-2009-0023676 filed Mar. 19, 2009, Korean Patent Application No. 10-2009-0030068 filed Apr. 7, 2009, Korean Patent Application No. 10-2009-0042843 filed on May 15, 2009, Korean Patent Application No. 10-2009-0042855 filed May 15, 2009, Korean Patent Application No. 10-2009-0042856 filed May 15, 2009, Korean Patent Application No. 10-2009-0042842 filed May 15, 2009, Korean Patent Application No. 10-2009-0043702 filed May 15, 2009, Korean Patent Application No. 10-2009-0047851 filed May 29, 2009, Korean Patent Application No. 10-2009-0087083 filed Sep. 15, 2009, Korean Patent Application No. 10-2009-0087024 filed Sep. 15, 2009, the entire disclosures of which are incorporated herein by reference.

BACKGROUND OF THE INVENTION

1. Technical Field

The present invention is related to an alignment material, an alignment layer, a liquid crystal display device and a method for manufacturing the same.

2. Background Art

Currently, various kinds of flat panel displays are being developed. Among them, a liquid crystal display is a flat panel display that is extensively used for the most various purposes.

Liquid crystal displays, according to an arrangement state of liquid crystal and a driving manner, comprise a TN (twisted nematic) liquid crystal display, a VA (vertically aligned) liquid crystal display, an IPS (in-plane switching) liquid crystal display, an OCB (optically compensated bend) liquid crystal display, and the like. In these liquid crystal displays, the liquid crystal has a predetermined arrangement at an early stage due to effects of an alignment layer and intrinsic properties of the liquid crystal, and the arrangement of the liquid crystal is changed if an electric field is applied thereto due to an optical anisotropic property of the liquid crystal, a polarization state of light passing through the liquid crystal varies according to an arrangement state of the liquid crystal, and the difference is represented by a difference in amount of light transmitted through a polarizer to display an image.

The alignment that determines an initial arrangement of the liquid crystal is mostly performed by rubbing the alignment layer in a predetermined direction using a rubbing method. However, since the rubbing method is mechanically performed, it is difficult to precisely control the initial alignment state of the liquid crystal and provide different pre-tilts for each fine region.

To solve the problems described above, there may be provided a photoalignment method that aligns the liquid crystal in a particular direction by way of irradiation. Nevertheless, in case the photoalignment method is used, the alignment may also be deteriorated because anchoring energy required is not sufficient enough.

DISCLOSURE

Technical Problem

The present invention provides a liquid crystal display device and a method of manufacturing the liquid crystal display device that improves its response speed.

The present invention also provides a liquid crystal display device and a method of manufacturing the liquid crystal display device that improve its viewing angles.

The present invention also provides a liquid crystal display device and a method of manufacturing the liquid crystal display device that forms an alignment layer in a single process.

The present invention also provides a liquid crystal display device and a method of manufacturing the liquid crystal display device that reinforces the alignment force of an alignment layer.

Other problems that the present invention solves will become more apparent through the following embodiments described below.

Technical Solution

To achieve the foregoing objectives and resolve the problems of the related art, an aspect of the present invention features a liquid crystal display device. The liquid crystal display device according to an embodiment of the present invention includes a first substrate that has a first electrode formed thereon, a second substrate that faces the first substrate, a liquid crystal layer that is formed between the first substrate and the second substrate, and a first alignment layer that is formed on the first substrate and is in contact with the liquid crystal layer. Here, the first alignment layer includes a first alignment base layer that is photoaligned, and a first alignment controlling layer that is extended from the inside of the first alignment base layer.

Another aspect of the present invention features a method of manufacturing a liquid crystal display device. The method according to an embodiment of the present invention includes (a) forming an alignment material on a first substrate and/or a second substrate, in which the alignment material is mixed with an alignment base material and a photopolymerizable monomer or oligomer, and (b) forming a first alignment layer and/or a second alignment layer by irradiating light onto the first substrate and/or the second substrate. Here, the first alignment layer and/or the second alignment layer includes an alignment base layer that is formed by photoaligning the alignment material, and an alignment controlling layer that is extended from the alignment base layer and is formed by photopolymerizing the photopolymerizable monomer or oligomer.

Still another aspect of the present invention features a method of manufacturing a liquid crystal display device. The method according to an embodiment of the present invention includes (a) forming an alignment material on a first substrate and/or a second substrate, in which a first electrode is formed on the first substrate and in which the first alignment material is mixed with an alignment base material and a photopolymerizable monomer or oligomer, (b) initially photoaligning the alignment base material by irradiating primary light onto the first substrate and/or the second substrate, (c) applying a voltage between the first electrode and an external electrode or between the first electrode and a second electrode, in which the second electrode is formed on any one side of the first substrate or the second substrate, and (d) forming a first alignment layer and/or a second alignment layer by irradiating light onto the first substrate and/or the second substrate. Here, the first alignment layer and/or the second alignment layer includes an alignment base layer that is formed by photoaligning the alignment material and an alignment controlling layer that is formed by polymerizing the photopolymerizable monomer or oligomer.

Yet another aspect of the present invention features an alignment layer suitable for aligning a liquid crystal layer that includes liquid crystal having positive or negative dielectric anisotropy. Here, the alignment layer includes an alignment base layer and a plurality of alignment regulators, and the alignment regulator is extended from the inside of the alignment base layer and is formed by polymerizing monomers or oligomers.

Yet another aspect of the present invention features an alignment material that has an alignment base material and a photopolymerizable monomer or oligomer. Here, the alignment material is used to form an alignment layer that includes liquid crystal having positive or negative dielectric anisotropy.

Advantageous Effects

The present invention provides a liquid crystal display device that improves the response speed of liquid crystal, when a driving voltage is applied, by adjusting the polar angle and azimuthal angle of the liquid crystal by use of an alignment base layer and an alignment controlling layer.

The present invention also provides a liquid crystal display device that reduces the production time and costs by manufacturing both an alignment base layer and an alignment controlling layer in a single process.

The present invention also provides a liquid crystal display device that imprives its viewing angles by making the polar angle and azimuthal angle of an alignment controlling layer different for each domain and then making the tilt angle of liquid crystal placed in each domain different for each domain.

The present invention also provides a liquid crystal display device that reinforces the alignment force of an alignment base layer that is photoaligned by an alignment controlling layer.

MODE FOR INVENTION

Figure 1:
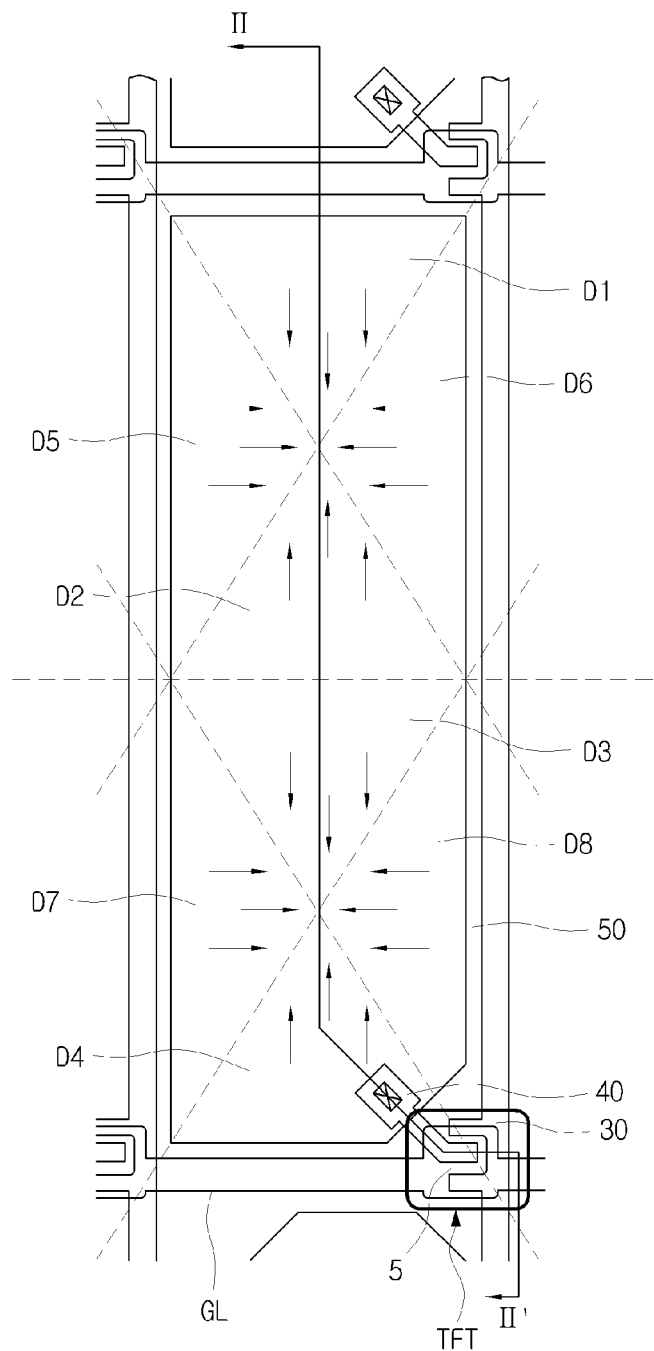
FIG. 1 is a plan view of a liquid crystal display panel in accordance with an embodiment of the present invention.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the spirit and scope of the present invention. Throughout the drawings, similar elements are given similar reference numerals. Throughout the description of the present invention, when describing a certain technology is determined to evade the point of the present invention, the pertinent detailed description will be omitted.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Certain embodiments in accordance with the present invention will be described in more detail through the below description with reference to the accompanying drawings. Those components that are the same or are in correspondence are rendered the same reference numeral regardless of the figure number, and redundant descriptions are omitted.

Figure 2:
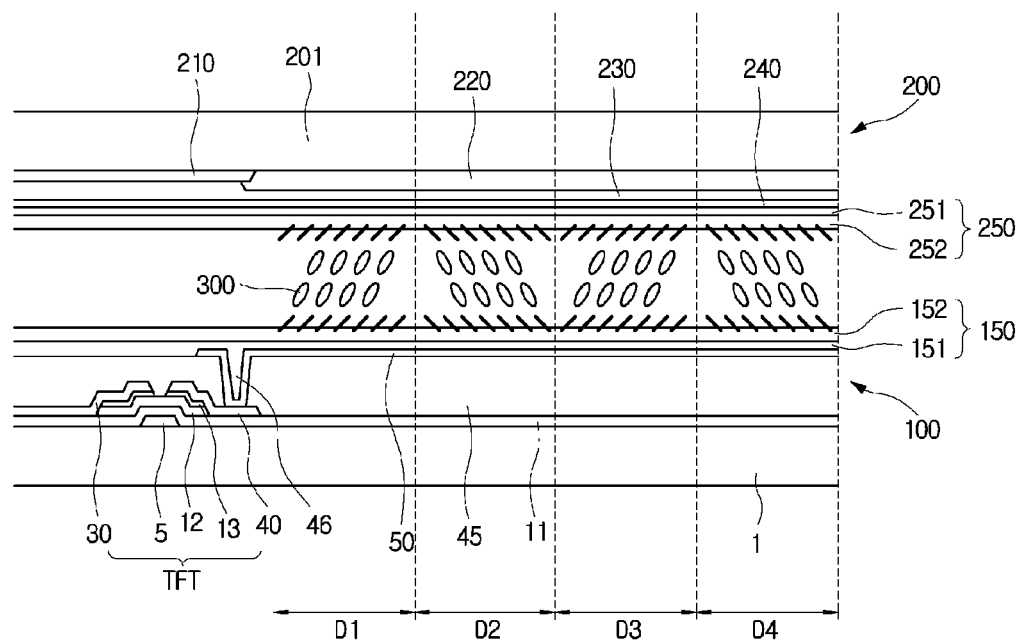
FIG. 2 is an enlarged transverse section II-II' of the liquid crystal display panel shown in FIG. 1.

FIG. 1 is a plan view of a liquid crystal display panel according to an embodiment of the present invention, and FIG. 2 is an enlarged transverse section II-II' of the liquid crystal display panel shown in FIG. 1. FIG. 1 is a plan view of a liquid crystal display panel of a VA mode liquid crystal display device and shows an example of a liquid crystal display panel implementing multi-domains without forming patterns in a pixel electrode and a common electrode.

Below, for the convenience of description, a first substrate will be referred to as a thin film transistor substrate, and a second substrate will be referred to as a color filter substrate.

Referring to FIGS. 1 and 2, a liquid crystal display panel according to an embodiment of the present invention includes a thin film transistor substrate 100, a color filter substrate 200 and a liquid crystal layer 300. Here, the liquid crystal layer 300 can include liquid crystal having dielectric anisotropy.

In a more detailed example, the thin film transistor substrate 100 includes a first insulation substrate 1, a thin film transistor (TFT), a passivation layer 45, and a pixel electrode 50. Here, a first alignment layer 150 is formed on the pixel electrode 50.

The first insulation substrate 1 is made of transparent glass or plastic, and a flexible transparent substrate can also be used for the first insulation substrate 1.

A gate line (GL) is formed on the first insulation substrate 1 in the horizontal direction and is connected to the thin film transistor (TFT).

A data line (DL) is connected to the thin film transistor (TFT) and is formed with the gate line (GL) crosswise.

The thin film transistor (TFT) is formed at the intersection of the gate line (GL) and the data line (DL). The thin film transistor (TFT) is connected with the gate line (GL) and the data line (DL) so that the thin film transistor (TFT) can be turned on/off by receiving a gate on/off voltage and/or a data voltage. Here, the thin film transistor (TFT) can be formed by either a bottom-gate type or a top-gate type. Although the present invention is described with an example in which the thin film transistor (TFT) is formed as the bottom-gate type, it shall be apparent that the present invention is not limited to this example, and that is generally understood by those with ordinary knowledge in the field of art to which the present invention belongs. The thin film transistor (TFT) may also be made of amorphous silicon or crystalloid silicon. In this description, however, the amorphous silicon will be used as an example of the thin film transistor (TFT).

The thin film transistor (TFT) can include a gate electrode 5, a semiconductor layer 12, an ohmic contact layer 13, a source electrode 30, and a drain electrode 40. The gate electrode 5 is connected to the gate line (GL) and supplies a gate on/off voltage. The gate electrode 5 can be formed on the same layer as that of the gate line (GL), and can be formed of the same metal as that of the gate line (GL).

The semiconductor layer 12 is formed with the gate electrode 5 in an overlapping manner in which a gate insulating layer 11 is interposed between the semiconductor layer 12 and the gate electrode 5. The semiconductor layer 12 can be made of amorphous silicon.

The ohmic contact layer 13 is formed on top of the semiconductor layer 12. Here, the ohmic contact layer 13 is formed in between the semiconductor layer 12 and the source electrode 30 and in between the semiconductor layer 12 and the drain electrode 40, respectively. The ohmic contact layer 13 can be made of amorphous silicon having n+ impurities mixed therein.

The source electrode 30 being in contact with the data line (DL) is formed on top of the ohmic contact layer 13.

The drain electrode 40 facing the source electrode 30 is formed on top of the ohmic contact layer 13. Here, the source electrode 30 and the drain electrode 40 are formed with the gate electrode 5 in an overlapping manner.

The passivation layer 45 is formed covering the source electrode 30, the drain electrode 40, and the data line (DL). The passivation layer 45 may be made of an inorganic insulating material or an organic insulating material. In FIG. 2, an organic insulating material can be used as an example of the passivation layer 45.

The pixel electrode 50 is formed in a pixel area that is formed by the gate line (GL) and the data line (DL) intersecting each other. The pixel electrode 50 is connected to the drain electrode 40 through a contact hole 46 that penetrates through the passivation layer 45 so as to expose the drain electrode 40.

The first alignment layer 150 is formed on top of the pixel electrode 50. The first alignment layer 150 has a pre-tilt, and can include a first alignment base layer 151 and a first alignment controlling layer 152.

In explanation of the present invention, the pre-tilt can have an angle and a direction. In the following description, they are defined as a polar angle [0° to 180°] and an azimuthal angle [0° to 360°] respectively.

In other words, the pre-tilt shall have meanings including both the polar angles 0-180° and the azimuthal angles 0-360°. The azimuthal angle means an angle between a gate line or a data line and a projection of a liquid crystal or an alignment regulator on the substrate. The polar angle means an angle between a perpendicular line of the substrate and the liquid crystal or the alignment regulator.

The first alignment layer 150 can include a first alignment base layer 151 that is photoaligned. Here, the first alignment base layer 151 can include a material of polymer series. In a more detailed example, the first alignment base layer 151 can include at least one of a poly-amic acid, a poly-imide, nylon, and PVA (polyvinyl alcohol).

The first alignment base layer 151 can also include a photoalignment material. The photoalignment material can be divided into a photolysis material, a photoisomerization material, a photocure material, and a photopolymerization material, depending on the types of chemical reactions caused by light. The photolysis material can be photoaligned by using the structural anisotropy that is formed by a chemical reaction, in which the disassembly of polymer chains is occurred anisotropically by polarized UV-light. For example, when polyimide is irradiated by polarized UV-light, its polymer chains are broken, and an oxidation reaction may occur. Such material may have excellent thermal stability.

In the photoisomerization material, cis/trans isomers may occur in the molecules thereof by light, and thus the photoisomerization material can be photoaligned by the directional molecules caused by the cis/trans isomers.

The photocure material can be photoaligned by having anisotropy that may be formed by selectively reacting photoreactors, which are aligned in a polarization direction by polarized UV-light.

The photopolymerization material forms polymers having a pre-tilt through a photopolymerization reaction when it is irradiated.

The photoalignment material can include a polymer material selected from a group consisting of polyimide, polyamic acid, polynorbornene, phenylmaleimide copolymers, polyvinylcinnamate, polyazobenzene, polyethyleneimine, polyvinyl alcohol, polyamide, polyethylene, polystyrene, polyphenylenephthalamide, polyester, polyurethane, polysiloxanecinnamate, cellulosecinnamate and polymethyl methacrylate. The first alignment base layer 151 can have a pre-tilt, and an azimuthal angle and a polar angle of the first alignment base layer 151 can be determined according to the polarization direction of light and/or the degree of gradient of the substrate when light is irradiated.

The first alignment controlling layer 152 is formed by polymerizing a photopolymerizable monomer or oligomer. As the photopolymerizable monomer or oligomer, for example, a reactive mesogen (RM), NOA series manufactured by Norland, Co., Ltd., and the like can be used for the first alignment controlling layer 152. Here, the mesogen may include a material or compound that includes at least one mesogen group with a rod-like, plate-like, or disk-like structure (that is, a mesogen group having the ability to induce fluidity in the liquid crystal). As a "calamitic" liquid crystal, the liquid crystal (LC) compound having the rod-like or plate-like structure is disclosed to those of ordinary skill in the field of art to which the present invention belongs. As a "discotic" liquid crystal, the liquid crystal compound having the disk-like structure is also disclosed to those of ordinary skill in the field of art. It shall be evident that a material or compound having a mesogen group does not essentially have to induce fluidity in the liquid crystal by itself. It is also possible to induce fluidity in the liquid crystal in a mixture of different compounds only, a mesogen compound or material, or a polymerizable mixture of those. Here, the reactive mesogen means a polymerizable mesogen compound.

The reactive mesogen is polymerized by light such as ultraviolet rays, and is a material that is aligned according to an alignment state of the adjacent material. Examples of the reactive mesogen may be a compound that is represented by the following formula:

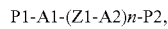

wherein, P1 and P2 are independently selected from acrylate, methacrylate, vinyl, vinyloxy, and epoxy groups, A1 and A2 are independently selected from 1,4-phenylene and naphthalene-2,6-diyl groups, Z1 is any one of COO—, OCO—, and single bonds, and n is any one of 0, 1, and 2.

In more detail, it may be a compound that is represented by any one of the following formulas:

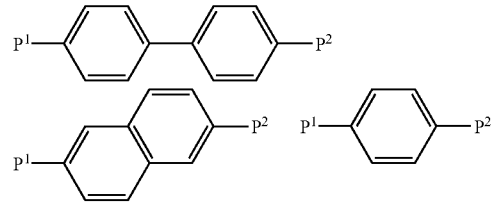

wherein, P1 and P2 are independently selected from acrylate, methacrylate, vinyl, vinyloxy, and epoxy groups.

The first alignment controlling layer 152 is formed with a plurality of branches extending towards the outside from the first alignment base layer 151 so as to have a pre-tilt.

The pre-tilt of the first alignment controlling layer 152 are controlled according to the pre-tilt of the first alignment base layer 151, or according to the alignment direction of the irradiation process or the liquid crystal layer 300. The process of irradiation will be described in more detail below.

The color filter substrate 200 includes a black matrix 210, a color filter 220, a flat-shaped layer 230, a common electrode 240, and a second alignment layer 250.

The second alignment layer 250 is formed on the common electrode 240. The second alignment layer 250 can include a second alignment base layer 251 and a second alignment controlling layer 252. The second alignment base layer 251 can be made of a polymer material of polymer series or photoalignment material, like the first alignment base layer 151.

The second alignment controlling layer 252 is formed by photopolymerizing the photopolymerizable monomer or oligomer, like the first alignment controlling layer 152. The second alignment controlling layer 252 is formed with a plurality of branches extending towards the outside from the inside of the second alignment base layer 251 so as to have a pre-tilt.

The second alignment base layer 251 and the second alignment controlling layer 252 can include the same material as those of the first alignment base layer 151 and the first alignment controlling layer 152, and can also be formed through the same process as those of the first alignment base layer 151 and the first alignment controlling layer 152. Therefore, the pertinent detailed description will be omitted.

The liquid crystal layer is formed between the first substrate and the second substrate. The liquid crystal layer includes the liquid crystal that has dielectric anisotropy and may be arranged according to a pre-tilt of the first alignment layer and the second alignment layer.

As in the example illustrated in FIG. 1, each pixel of a liquid crystal display panel according to an embodiment of the present invention can be divided into a plurality of domains, i.e., eight domains. Here, the domain means a portion that has a liquid crystal layer with the same pre-tilt, i.e., the same azimuthal angle and the same polar angle. Thus, the pre-tilt of the liquid crystal layer can vary for each domain. As in the example illustrated in FIG. 1, the pixel of the liquid crystal display panel according to an embodiment of the present invention can be divided into an upper section and a lower section. The upper section of the pixel is constituted by four domains from its center point, and the lower section thereof is also constituted by four domains from its center point. The four domains of the upper section includes a first alignment controlling layer 152 that has a different azimuthal angle for each domain and a first polar angle. Likewise, the four domains of the lower section includes a first alignment controlling layer 152 that has a different azimuthal angle for each domain and a second polar angle. As described above, the azimuthal angle of the first alignment layer 151 can be the same as that of the first alignment controlling layer 152 for each domain.

Although the present invention is described with an example in which one pixel is divided into eight domains, it shall be apparent that the present invention is not limited to this example. In another example, one pixel can be divided into two or more domains. This will be described in more detail below with reference to the related drawings.

Figure 3:
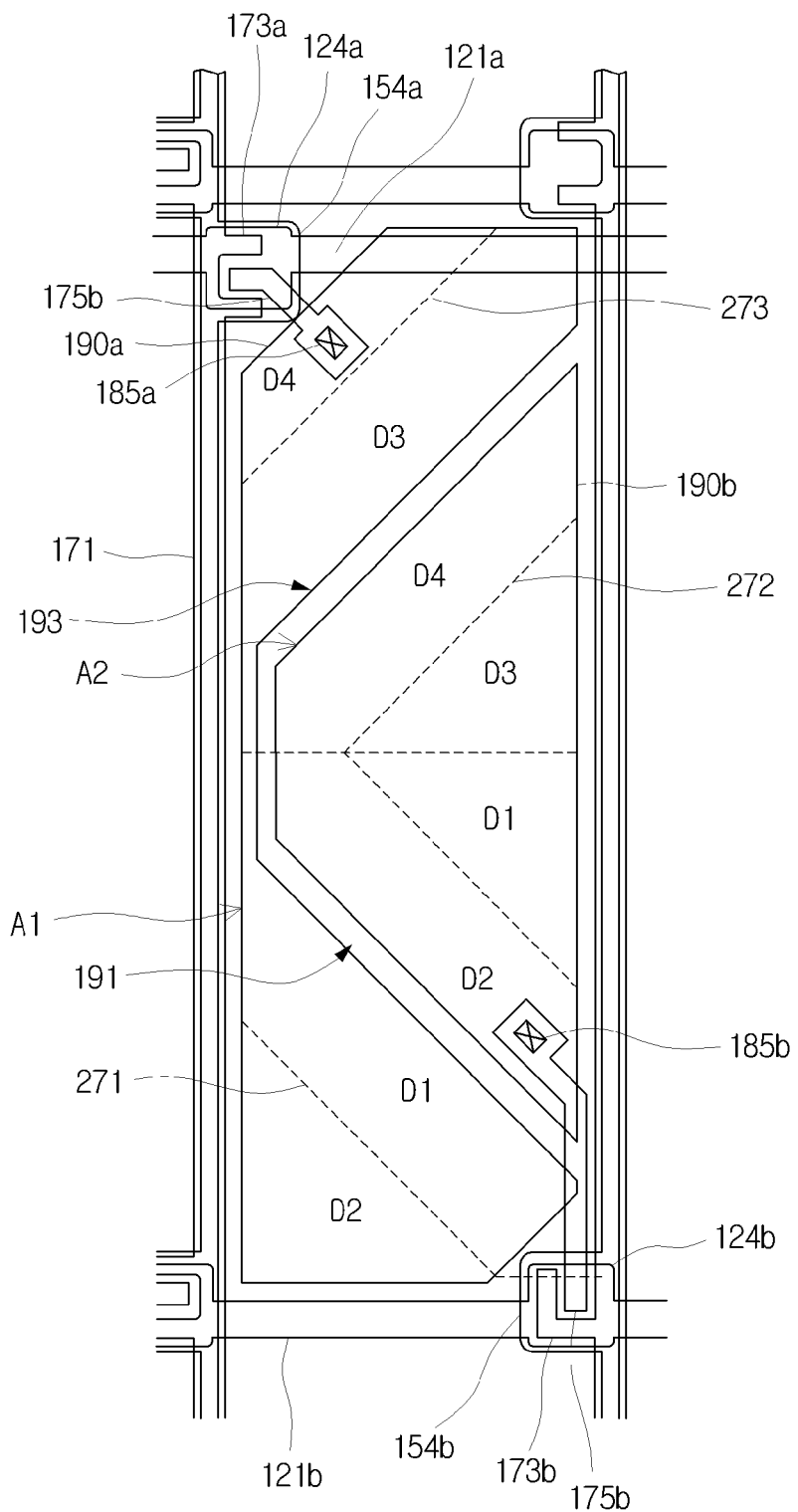
FIG. 3 is a plan view of a liquid crystal display device in accordance with an embodiment of the present invention.

FIG. 3 is a plan view of a liquid crystal display device according to an embodiment of the present invention As illustrated in FIG. 3, the first substrate 100 includes a first gate line 121a and a second gate line 121b. The first gate line 121a and the second gate line 121b are extended in the horizontal direction, are physically and electrically separated from each other, and are configured to transmit a gate signal.

The first and second gate lines 121a and 121b are disposed on an upper side and a lower side, respectively, and can include a first gate electrode 124a and a second gate electrode 124b that are protruded upwards and downwards, respectively.

A gate insulating layer 11 is formed on the first and second gate electrodes 124a and 124b. A semiconductor layer 12 that is made of amorphous silicon and the like is formed on the gate insulating layer 11.

Since the semiconductor layer 12 and the ohmic contact are the same as the previously described embodiment of the present invention, detailed explanations will be omitted hereinafter.

First and second source electrodes 173a and 173b and first and second drain electrodes 175a and 175b are formed on the ohmic contact layer. The first and second gate electrodes 124a and 124b, the first and second source electrodes 173a and 173b, and the first and second drain electrodes 175a and 175b may form first and second thin film transistors (TFT1 and TFT2) in conjunction with the semiconductor layer 12.

A passivation layer 45 that has contact holes 185a and 185b is formed on the gate insulating layer 11, the first and second source electrodes 173a and 173b, the first and second drain electrodes 175a and 175b, and the semiconductor layer 12.

A plurality of pixel electrodes that include a first sub-pixel electrode 190a and a second sub-pixel electrode 190b, respectively, are formed on the passivation layer 45. The first and second sub-pixel electrodes 190a and 190b are physically and electrically connected to the first and second drain electrodes 175a and 175b through the contact holes 185a and 185b, and can receive a data voltage from the first and second drain electrodes 175a and 175b.

An alignment layer that has a pre-tilt is formed on the first and second sub-pixel electrodes 190a and 190b. The first alignment layer 150 includes a first alignment base layer 151 that is photoaligned and a first alignment controlling layer 152.

As described with reference to FIG. 1, the first alignment base layer 151 can be made of a material of polymer series or a photoalignment material.

The first alignment controlling layer 152 can include a material that is formed by photopolymerizing monomers or oligomers. The detailed description of material of the first alignment base layer 151 and the first alignment controlling layer 152 will be omitted.

The first sub-pixel electrode 190a is placed in a first section (A1) and is divided into a first domain (D1), a second domain (D2), a third domain (D3), and a fourth domain (D4). The second sub-pixel electrode 190b is placed in a second section (A2) and is divided into a first domain (D1), a second domain (D2), a third domain (D3), and a fourth domain (D4). A higher voltage is applied to the first sub-pixel electrode 190a than the second sub-pixel electrode 190b. Therefore, when an initial voltage is applied, the liquid crystal of the liquid crystal layer 300 is immediately tilted at the pre-tilt according to the pre-tilt of the liquid crystal adjacent to the alignment controlling layer 152 of the first alignment layer 150, thus improving the response speed. The tilt angle of the liquid crystal is different for each domain, thus improving the side visibility. After a certain amount of time has passed after the initial voltage applying, the tilt angle of the liquid crystal can be maintained different for each section by the first sub-pixel electrode 190a and the second sub-pixel electrode 190 that are placed in a different section and are driven by a different voltage, thus improving the side visibility. In a more detailed explanation, by controlling the voltage of the first section (A1) and the second section (A2) by use of the first and second thin film transistors, respectively, the gamma curve of each section can be controlled. In this way, the combined gamma curve of the sections can be close to the reference gamma curve that is obtained by viewing from the front, thus improving the side visibility.

Although the present invention is described with an example in which the first alignment layer 150 is formed, it is also possible that a second alignment layer 250 is formed on the color filter substrate 200. It is also possible that an alignment layer is formed on the color filter substrate 200 only.

The liquid crystal layer is formed between the first substrate and the second substrate. The liquid crystal layer includes the liquid crystal that has dielectric anisotropy and may be arranged according to a pre-tilt of the first alignment layer and the second alignment layer.

Figure 4:
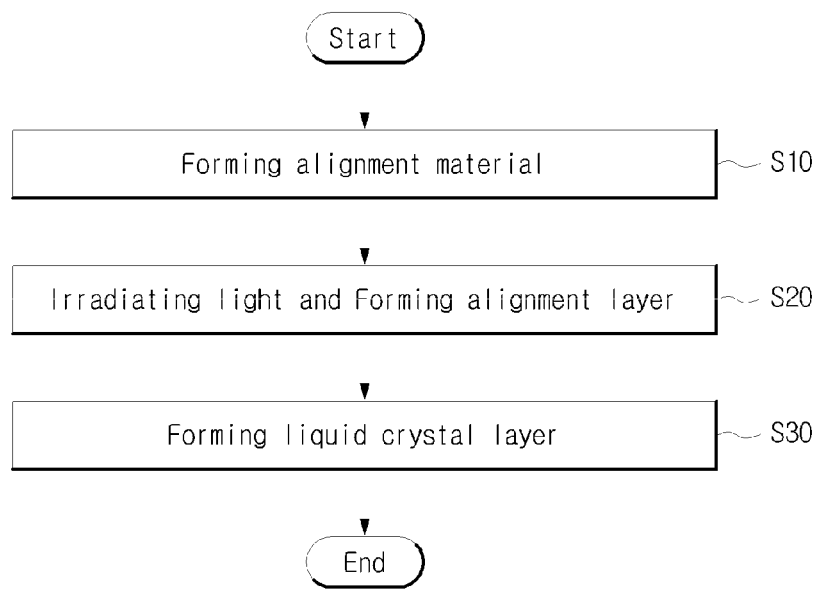
FIG. 4 is a flow diagram illustrating a method of manufacturing a liquid crystal display device in accordance with an embodiment of the present invention.

FIG. 4 is a flowchart sequentially illustrating a method of manufacturing a liquid crystal display device according to an embodiment of the present invention, and FIGS. 5 to 9 show the process flow of a method of manufacturing a liquid crystal display device according to an embodiment of the present invention.

Referring to FIG. 4, the method of manufacturing a liquid crystal display device according to an embodiment of the present invention includes the steps of forming an alignment material that is mixed with a photopolymerizable monomer or oligomer and an alignment base material on a first substrate or a second substrate (S10), forming an alignment layer by irradiating light onto the substrate on which the alignment material is formed (S20), and forming a liquid crystal layer (S30). In this description, the first substrate will be referred to as a thin film transistor substrate, and the second substrate will be referred to as a color filter substrate. Coupling the first substrate and the second substrate to each other can be performed before or after the forming of the liquid crystal layer.

Figure 5:
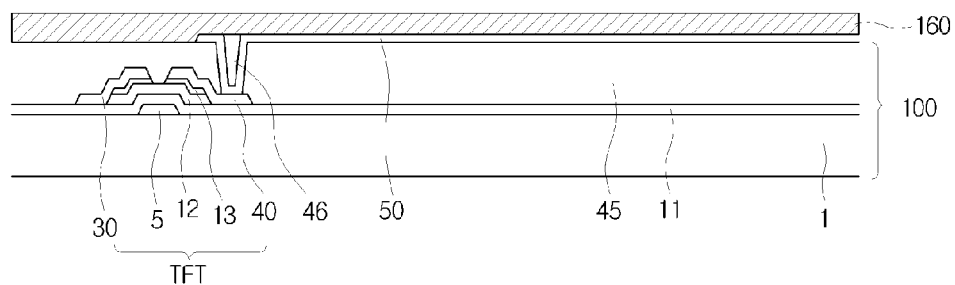
FIGS. 5 to 9 show the process flow of the method of manufacturing a liquid crystal display device shown in FIG. 4.

Referring to FIG. 5, an alignment material 160 that is mixed with a photopolymerizable monomer or oligomer and an alignment base material is formed on a thin film transistor substrate 100. In one example, the alignment base material can be made of a polymer material selected from a group consisting of polyimide, polyamic acid, polynorbornene, phenylmaleimide copolymers, polyvinylcinnamate, polyazobenzene, polyethyleneimine, polyvinyl alcohol, polyamide, polyethylene, polystylene, polyphenylenephthalamide, polyester, polyurethane, polysiloxanecinnamate, cellulosecinnamate and polymethyl methacrylate.

The photopolymerizable monomer or oligomer can include a reactive mesogen, but is not limited to this. NOA series manufactured by Norland, Co., Ltd., and the like can also be used as the photopolymerizable monomer or oligomer.

The reactive mesogen is polymerized by light, as described with reference to FIGS. 1 and 2, and can be aligned according to an alignment state of the adjacent material. Examples of the reactive mesogen may be a compound that is represented by the following formula:

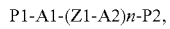

wherein, P1 and P2 are independently selected from acrylate, methacrylate, vinyl, vinyloxy, and epoxy groups, A1 and A2 are independently selected from 1,4-phenylene and naphthalene-2,6-diyl groups, Z1 is any one of COO—, OCO—, and single bonds, and n is any one of 0, 1, and 2.

In more detail, it may be a compound that is represented by any one of the following formulas:

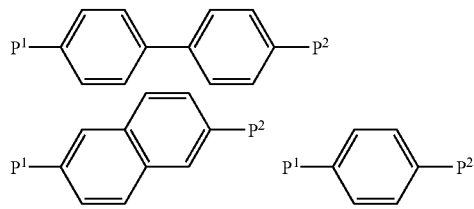

wherein, P1 and P2 are independently selected from acrylate, methacrylate, vinyl, vinyloxy, and epoxy groups.

The mass of the photopolymerizable monomer or oligomer can occupy 0.1 wt %~50 wt % of the total mass of the alignment base material mixed with the photopolymerizable monomer or oligomer in which a solvent is removed from the alignment base material. In case the photopolymerizable monomer or oligomer is included below 0.1 wt % of the total mass, it may be too small to determine the pre-tilt of the liquid crystal by photopolymerizing the photopolymerizable monomer or oligomer, or to align the liquid crystal without the rubbing process. On the other hand, in case the photopolymerizable monomer or oligomer is included exceeding 50 wt % of the total mass, the alignment force of an alignment control agent that is obtained by photopolymerizing the photopolymerizable monomer or oligomer may be too strong, thus overwhelming an effect of alignment by the alignment base material, and the liquid crystal may also be contaminated by unreacted monomers or oligomers that are left without being photopolymerized in the photopolymerizing process.

While the photopolymerizable monomer or oligomer is mixed with the alignment base material and coated, a polymerization initiator can be further used. Even though the polymerization initiator is not necessary required, the polymerization of the photopolymerizable monomer or oligomer can be performed quickly by using the polymerization initiator. As the polymerization initiator, for example, benzoyl peroxide, cumene hydroperoxide, t-butyl percolate, dicumyl peroxide, benzoyl alkyl ether series, acetophenone series, benzophenone series, xanthone series, benzoin ether series, and benzyl ketal series can be used in addition to methyl ethyl ketone peroxide, and they may be used directly or used by mixing them appropriately.

It shall be preferable that the amount of the polymerization initiator to be used is 10 wt % of the polymerizable compound or less. If the polymerization initiator is used greater than 10 wt %, the polymerization initiator acts as impurities, thus deteriorating the displaying quality. Nevertheless, the amount to be used is not limited to 10 wt %, any optimum amount of the polymerization initiator can be used when photopolymerizing.

Next, an alignment layer is formed by irradiating light such as ultraviolet rays onto the first substrate on which the alignment material is formed (S20). By irradiating the UV-light onto the substrate, an alignment base material that is included in the alignment material is photoaligned, and at the same time, an alignment controlling layer is formed. Here, the UV-light may be polarized UV-light. The irradiating UV-light can be, for example, polarized UV-light that is linear polarized, elliptical polarized, or circular polarized. In case non-polarized UV-light is used, a polarizer that is adjacent to the substrate can be used in such a way that polarized UV-light can be irradiated onto the substrate.

In case a liquid crystal display device that has a plurality of domains is manufactured, by irradiating UV-light having a polarization direction or polarization form that is different from that of its adjacent domain, any one of the domains is formed in such a way that an azimuthal angle of the alignment layer can be different for each domain.

This will be described in more detail with reference to FIGS. 6 to 9. In this embodiment, a method of irradiating linear polarized UV-light will be described as an example.

Figure 6:
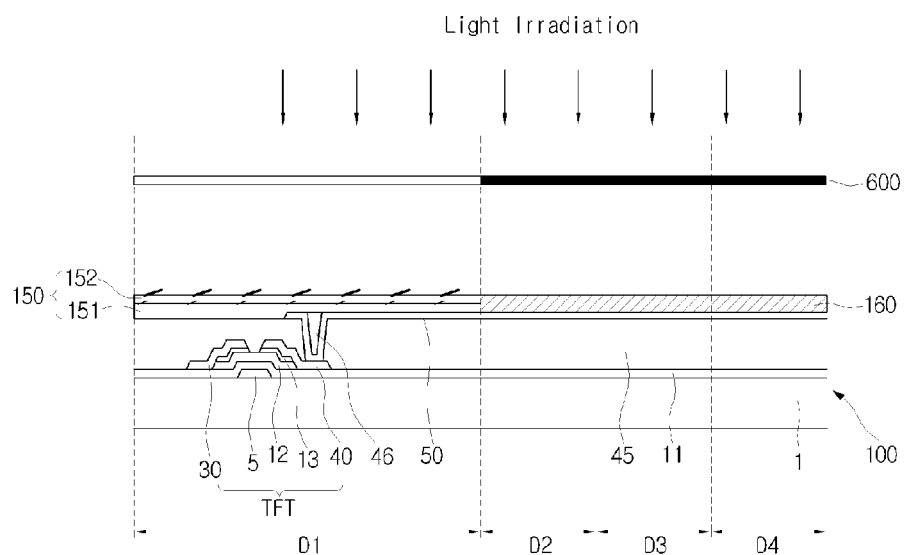

Referring to FIG. 6, by irradiating UV-light that is linear polarized in a first direction onto the first domain (D1), the alignment base material is photoaligned so that the alignment base layer is photoaligned, and the alignment controlling layer is formed by photopolymerizing the photopolymerizable monomer or oligomer. Here, while the first domain is irradiated by the UV-light that is linear polarized in the first direction, the other domains are protected from the irradiating UV-light by using a mask 600.

Here, the azimuthal angle of the alignment base layer 151 of the first domain (D1) can be the same as or perpendicular to the first direction according to the properties of the alignment base material. However, it is possible that the azimuthal angle is determined according to the photoalignment properties or reactions of the alignment base material.

The alignment controlling layer 152 of the first domain (D1) can have the same azimuthal angle as that of the alignment base layer 151. Also, the alignment controlling layer may be arranged according to its components and the polarization direction or polarization form of the UV-light so as to control the azimuthal angle.

Figure 7:
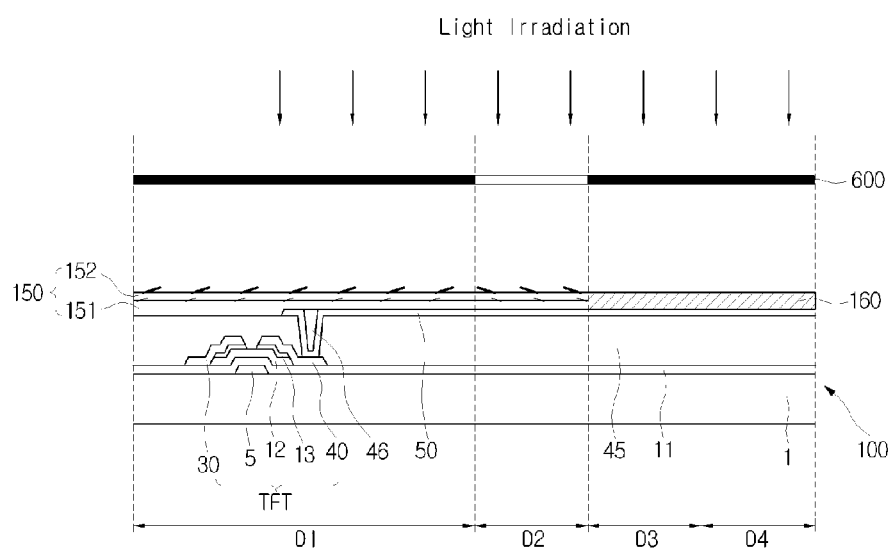

Next, as illustrated in FIG. 7, an alignment base layer and an alignment controlling layer are formed by irradiating UV-light that is linear polarized in a second direction onto the second domain (D2). Then, as illustrated in FIG. 8, an alignment base layer and an alignment controlling layer can also be formed on the other domains by using the above method, and the last domain can be irradiated by UV-light that is linear polarized in an n direction without using the mask.

Although the present embodiment is described with a method of forming an alignment layer having multi-domains by differing the polarization direction of UV-light, it is also possible to form the alignment layer having multi-domains by a method that is different from the above method. This will be described in more detail below with reference to FIG. 9.

Figure 9:
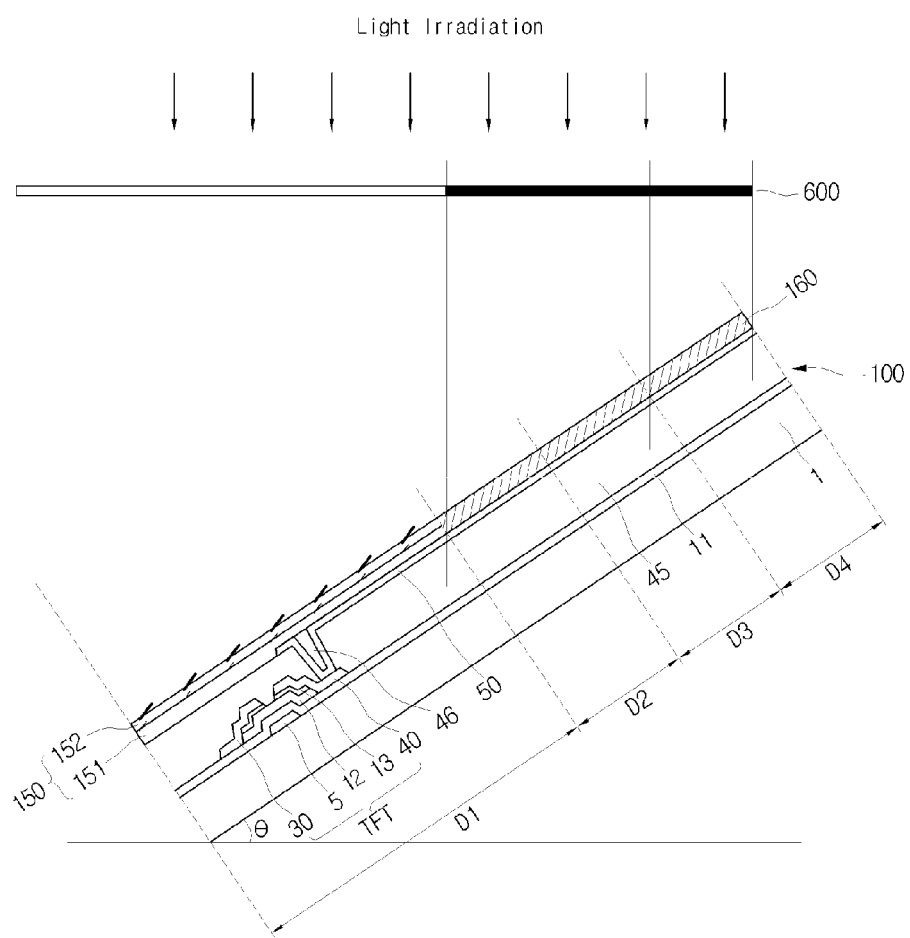

Referring to FIG. 9, UV-light is irradiated onto the first domain (D1) as the first substrate 100 is tilted at a first angle θ. Here, the other domains are protected from the irradiating UV-light by using the mask 600. In this way, a polar angle of the alignment layer 150 can be determined according to the tilt angle of the substrate 100. Although not shown in the accompany drawings, the alignment layer is formed on the second domain after the substrate is sloped in a different direction or different angle (D2). By using the above method, the other domains can have the alignment layer formed thereon, and the last domain can be irradiated by the UV-light without using the mask. In this way, the pre-tilt of the alignment layer can be different for each domain.

Figure 8:
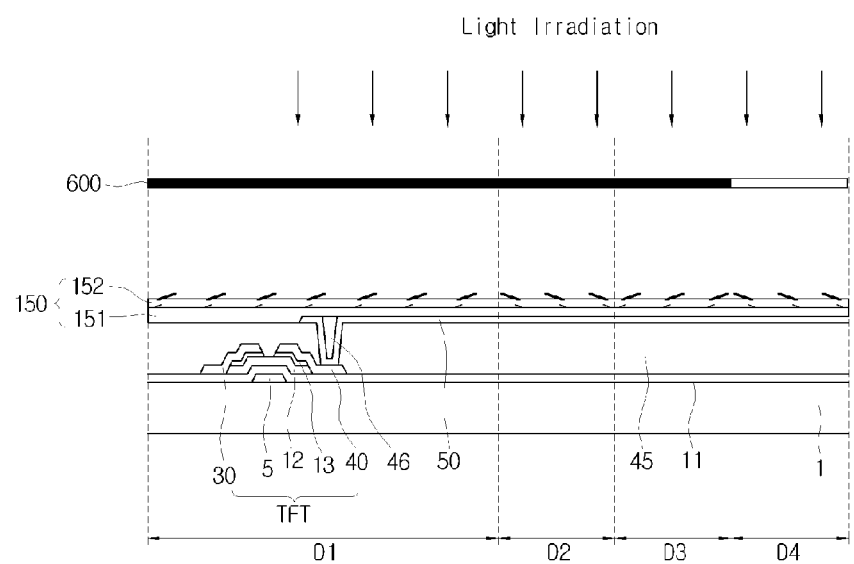

Although the present invention is described with a process of irradiating polarized UV-light by referring to FIGS. 6 to 8, and with a process of irradiating UV-light onto the substrate that is tilted by referring to FIG. 9, it is also possible that the two processes are performed separately, simultaneously, or sequentially.

Furthermore, a desired azimuthal angle or polar angle can be obtained by adjusting the duration or intensity of irradiation while the UV-light is irradiated.

Next, a liquid crystal layer is formed (S30). Here, the forming of the liquid crystal layer can be performed before or after the coupling of the first substrate and the second substrate. Introducing the liquid crystal is performed by a dropping method or a vacuum injecting method. The liquid crystal layer can be aligned according to the alignment properties of the alignment layer.

Although the present invention is described with an example in which the alignment layer is formed on the first substrate, it is also possible that the alignment layer is formed on the second substrate only. Moreover, it is possible that the alignment layer is formed on both the first substrate and the second substrate, on each of which a separate alignment layer having a different pre-tilt is formed through the above method. It is also possible that after coupling the first substrate and the second substrate, light can be irradiated on the first substrate and the second substrate so that a first alignment layer and a second alignment layer, each of which has the same pre-tilt, can be formed with reference to the first substrate.

In case the alignment layer is formed on each of the first substrate and the second substrate, a first alignment layer of the first substrate and a second alignment layer of the second substrate may have the same azimuthal angle and polar angle for each other, or may have a different azimuthal angle and polar angle. For example, from the polar angle of the first alignment layer as a reference, the polar angle of the second alignment layer can be formed anywhere between 0° and 180°, and from the azimuthal angle of the first alignment layer as a reference, the azimuthal angle of the second alignment layer can be selected from anywhere between 0° and 360°.

According to a method of manufacturing a liquid crystal device based on an embodiment of the present invention, the alignment force of the liquid crystal can be reinforced by the alignment base layer and the alignment controlling layer. Also, since multi-domains can be formed without forming a domain dividing means on the pixel electrode and the common electrode, the viewing angle can be improved, and the opening ratio can be improved.

Figure 10:
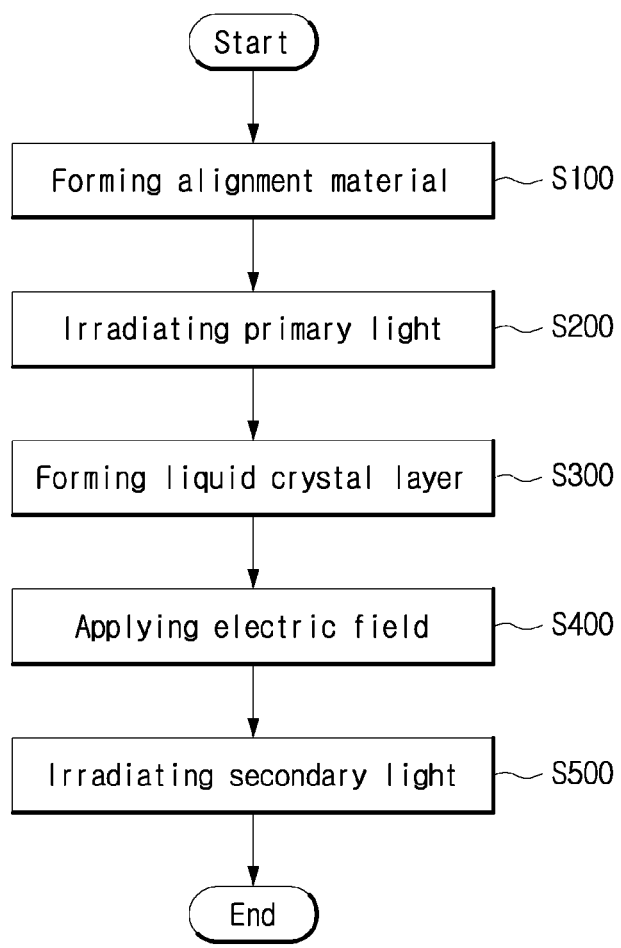
FIG. 10 is a flow diagram illustrating a method of manufacturing a liquid crystal display device in accordance with another embodiment of the present invention.

FIG. 10 is a flowchart illustrating a method of manufacturing a liquid crystal display device according to another embodiment of the present invention. Referring to FIG. 10, the method of manufacturing a liquid crystal display device according to an embodiment of the present invention includes the steps of forming an alignment material that is mixed with a photopolymerizable monomer or oligomer and an alignment base material on a first substrate or a second substrate (S100), initially aligning the alignment material by irradiating primary UV-light onto the substrate on which the alignment material is formed (S200), forming an liquid crystal layer (S300), applying an electric field (S400), and forming an alignment layer by irradiating secondary UV-light (S500). Here, the first substrate will be referred to as a thin film transistor substrate, and the second substrate will be referred to as a color filter substrate. First, an alignment material that is mixed with a photopolymerizable monomer or oligomer and an alignment base material is formed on the first substrate (S100). The alignment base material can be made of a polymer material, and can include a photoalignment material. The photopolymerizable monomer or oligomer can include a reactive mesogen. The alignment material can further include a polymerization initiator. Redundant explanations will be omitted hereinafter.

Figure 11:
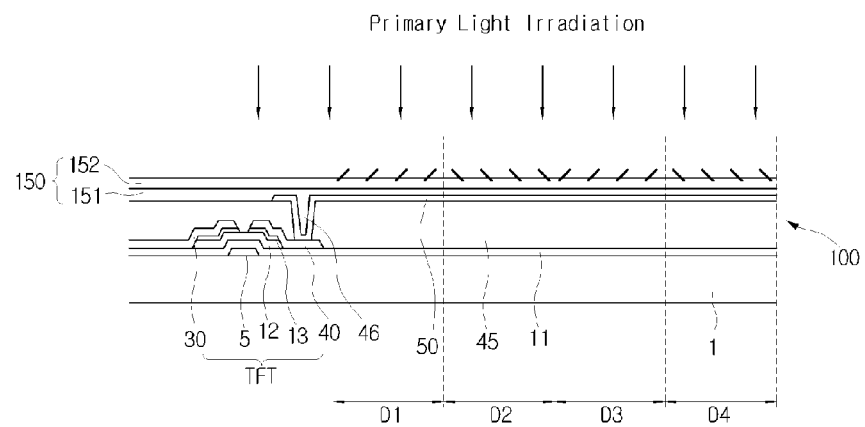
FIGS. 11 and 12 show the process flow of the method of manufacturing a liquid crystal display device shown in FIG. 10.

Next, as illustrated in FIG. 11, an alignment material is aligned initially by irradiating primary UV-light on the first substrate on which the alignment material is formed (S200). When the primary UV-light is irradiated, the alignment base material is photoaligned. Then, a portion of the photopolymerizable monomer or oligomer is polymerized as a polymer by the UV-light on the surface of the alignment material, and the polymerized polymer can reinforce the alignment force of the alignment base material. The UV-light may be polarized UV-light. The irradiating UV-light can be, for example, polarized UV-light that is linear polarized, elliptical polarized, or circular polarized. In case nonpolarized UV-light is used, a polarizer that is adjacent to the substrate can be used so that polarized UV-light can be irradiated onto the substrate. It is also possible that the irradiating of the primary UV-light is performed by irradiating the UV-light onto the substrate that is tilted at an angle. The process of irradiating the polymerized UV-light and the process of irradiating the UV-light onto the sloped substrate can be performed separately, simultaneously, or sequentially.

The pre-tilt of the alignment base material can be adjusted according to a polarization state and polarization direction of the UV-light or a tilt angle of the substrate.

Here, the irradiating of the primary UV-light is performed by irradiating separate UV-light having a polarization direction or polarization form that is different for each domain, or by irradiating light onto the first substrate that is tilted at an angle that is different for each domain, thus implementing multi-domains. In an embodiment of the present invention, a primary alignment is performed separately on the first substrate and the second substrate, respectively, and then the two substrates are coupled to each other. However, the present invention is not limited to this embodiment, and it is also possible that after coupling the two substrates, light can be irradiated so as to perform the primary alignment. Here, the alignment base material formed on the first substrate and the second substrate can be photoaligned so as to have the same pre-tilt with reference to the first substrate.

Next, a liquid crystal layer is formed (S300). The liquid crystal layer can be formed before or after the coupling of the first substrate and the second substrate, and the introducing of the liquid crystal can be performed by the dropping method or the vacuum injecting method.

Figure 12:
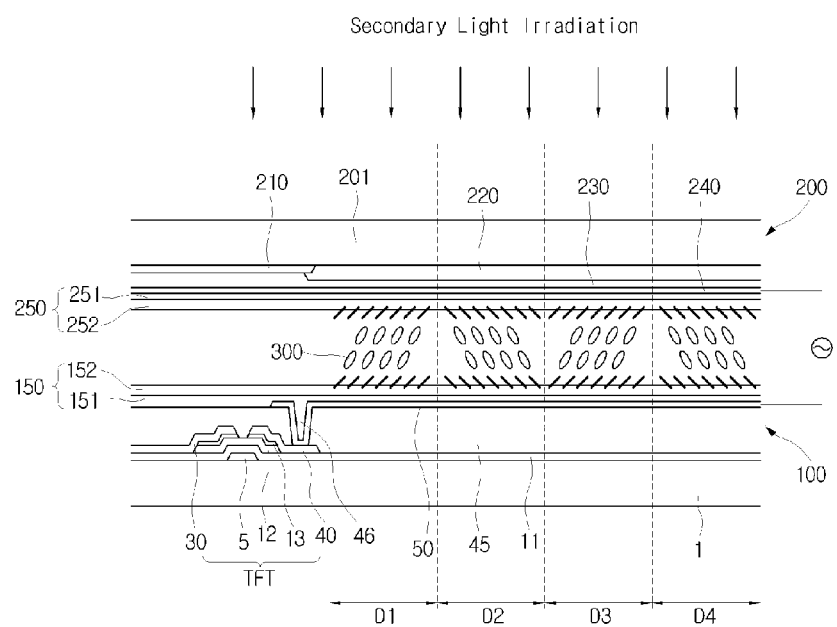

Then, as illustrated in FIG. 12, an electric field is formed by applying a voltage to an electrode that is formed on the first substrate and/or the second substrate, and the liquid crystal layer 300 is aligned in a certain direction (S400). Here, the liquid crystal molecules are rearranged according to the alignment direction of the alignment base material and the direction and magnitude of the electric field that is formed when the voltage is applied. The voltage being applied may be anywhere between a few volts and a few ten volts, and the duration of time during which the voltage is applied may be between a few seconds and two hours. However, the present embodiment is not limited to the above examples. Then, as illustrated in FIG. 12, the secondary UV-light is irradiated (S400). In a state in which the voltage is applied, the photopolymerizable monomer or oligomer is photopolymerized by irradiating the UV-light to form the alignment controlling layer.

Like the irradiating of the primary UV-light, the irradiating of the secondary UV-light is also performed by irradiating separate UV-light having a polarization direction or polarization form that is different for each domain, or by irradiating light onto the first substrate that is tilted at an angle that is different for each domain, thus implementing multi-domains. Although the present invention is described with an example in which the alignment layer is formed on the first substrate and the second substrate, as illustrated in FIGS. 10 to 12, it is also possible that the alignment layer is formed on the first substrate or the second substrate only.

Figure 13:
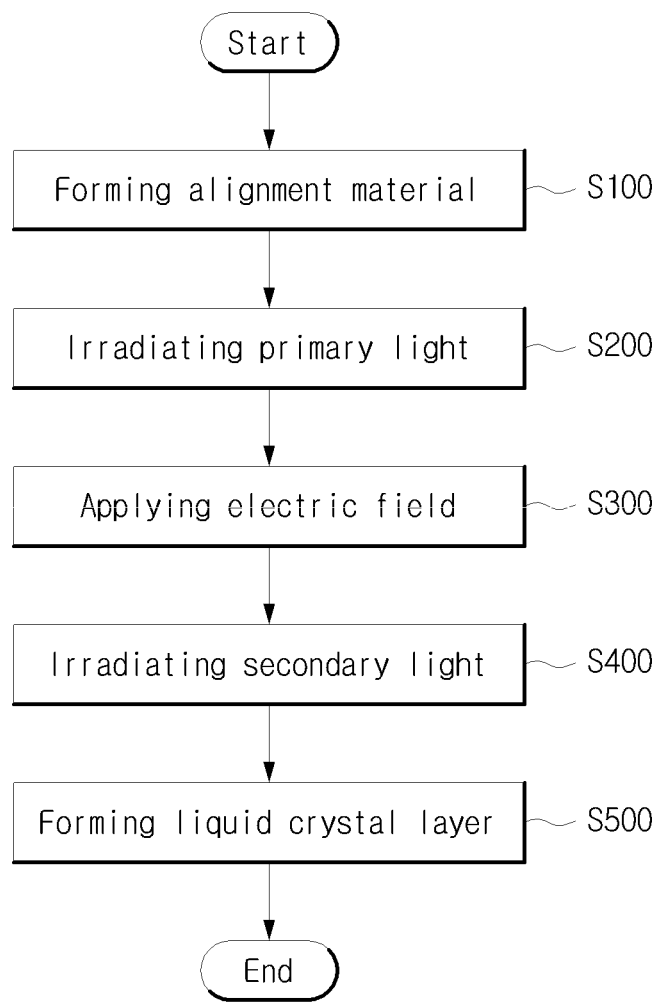
FIG. 13 is a flowchart illustrating a method of manufacturing a liquid crystal display device in accordance with an embodiment of the present invention.

FIG. 13 is a flowchart illustrating a method of manufacturing a liquid crystal display device according to an embodiment of the present invention.

Referring to FIG. 13, the method of manufacturing a liquid crystal display device according to an embodiment of the present invention includes the steps of forming an alignment material that is mixed with a photopolymerizable monomer or oligomer and an alignment base material on a first substrate or a second substrate (S100), initially aligning the alignment material by irradiating primary UV-light onto the substrate on which the alignment material is formed (S200), applying an electric field (S300), forming an alignment layer by irradiating secondary UV-light (S400), and forming an liquid crystal layer (S500). Here, the first substrate may be a transistor substrate or a substrate on which a pixel electrode and/or a common electrode is formed.

First, an alignment material that is mixed with a photopolymerizable monomer or oligomer and an alignment base material is formed on the first substrate or the second substrate (S100). The alignment base material can be made of a polymer material, and can include a photoalignment material. The photopolymerizable monomer or oligomer can include a reactive mesogen. The alignment material can further include a polymerization initiator. Redundant explanations will be omitted hereinafter.

Next, an alignment material is aligned initially by irradiating light such as ultraviolet rays (S200). When the primary UV-light is irradiated, the alignment base material is photoaligned.

Here, a portion of the photopolymerizable monomer or oligomer is polymerized as a polymer by the UV-light on the surface of the alignment material, and the polymerized polymer can reinforce the alignment force of the alignment base material. Here, the UV-light may be polarized UV-light. The irradiating UV-light can be, for example, polarized UV-light that is linear polarized, elliptical polarized, or circular polarized. In case nonpolarized UV-light is used, a polarizer that is adjacent to the substrate can be used so that polarized UV-light can be irradiated onto the substrate.

In cases where a liquid crystal display device that has a plurality of domains is manufactured, the irradiating of the primary UV-light is performed by irradiating separate UV-light having a polarization direction or polarization form that is different for each domain, or by irradiating light onto the first substrate that is tilted at an angle that is different for each domain. A process of irradiating polarized UV-light and a process of irradiating UV-light onto the sloped substrate can be performed separately, simultaneously, or sequentially.

In an embodiment of the present invention, a primary alignment is performed separately on the first substrate and the second substrate, respectively.

However, the present invention is not limited to this embodiment, and it is also possible that after coupling the first and second substrates, light can be irradiated so as to perform the primary alignment. Here, the alignment base material formed on the first substrate and the second substrate can be photoaligned so as to have the same pre-tilt with reference to the first substrate.

Next, an electric field is applied (S300). The applying of the electric field can be performed by using an electrode that is formed on each of the first and second substrates after the first and second substrates are coupled to each other. Unlike this, a voltage can be applied between two electrodes, one of which is installed on the outside thereof and the other one of which is formed on the first substrate, and if the first substrate is formed with both the pixel electrode and the common electrode, the voltage can be applied between the two electrodes of the first substrate. The voltage being applied may fall anywhere between a few volts and a few ten volts, and the duration of time during which the voltage is applied may be between a few seconds and two hours. However, the present embodiment is not limited to the above examples. By applying the electric field, the photopolymerizable monomer or oligomer mixed in the alignment base material becomes reactive to the electric field so that photopolymerizable monomer or oligomer can be rearranged.

A solvent can be added into the alignment material before applying the electric field. In a more detailed example, the solvent can be sprayed on the primary aligned alignment material, or can be injected into the space between the first substrate and the second substrate after the first substrate and the second substrate on which the primary aligned alignment material is formed are coupled to each other. In case the solvent is added into the alignment material, the viscosity of the alignment material is lowered so that the photopolymerizable monomer or oligomer can be rearranged effectively by the electric field. Here, the solvent can be, for example, Propylene Glycol Methyl Ether Acetate (PGMEA) or an aromatic solvent such as toluene and xylene. After the photopolymerizable monomer or oligomer is rearranged by applying the electric field, or after the photopolymerizable monomer or oligomers is polymerized, the solvent can be removed by performing a vacuum removing process, a heating process or an air drying process.

Next, an alignment layer is formed by irradiating the secondary UV-light (S400). In a state in which the voltage is applied, the photopolymerizable monomer or oligomer is photopolymerized by irradiating the UV-light to form an alignment controlling layer. Here, the alignment controlling layer may be arranged according to the effect of the electric field and according to the polarization direction and irradiation angle of the secondary UV-light so as to have an azimuthal angle and a polar angle.

Next, a liquid crystal layer is formed (S500). The liquid crystal layer can be formed before or after the coupling of the first substrate and the second substrate. Introducing the liquid crystal is performed by the dropping method or the vacuum injecting method. The liquid crystal layer can be arranged according to the pre-tilt of the alignment layer.

Although the present embodiment of the present invention is described with an example in which the alignment layer is formed on the first substrate, it is also possible that the alignment layer is formed on both the first substrate and the second substrate.

Figure 14:
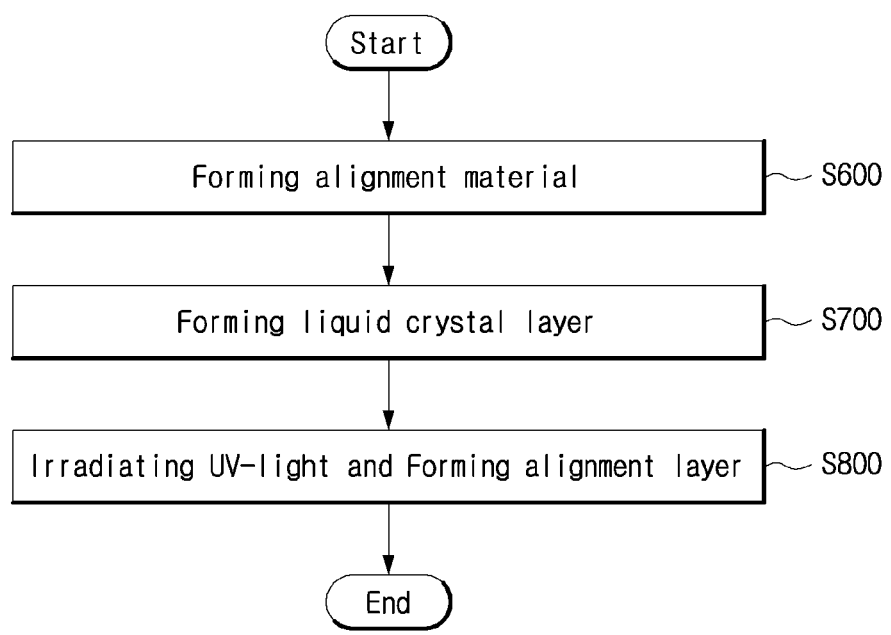
FIG. 14 is a flow diagram sequentially illustrating a method of manufacturing a liquid crystal display device in accordance with another embodiment of the present invention.

FIG. 14 is a flow diagram sequentially illustrating a method of manufacturing a liquid crystal display device according to another embodiment of the present invention.

Referring to FIG. 14, the method of manufacturing a liquid crystal display device according to an embodiment of the present invention includes the steps of forming an alignment material that is mixed with a photopolymerizable monomer or oligomer and an alignment base material on a first substrate or a second substrate (S600), forming a liquid crystal layer (S700), and forming an alignment layer by irradiating UV-light (S800). In a more detailed example, forming the alignment material (S600) is implemented by forming the alignment material on the first substrate or the second substrate. In this description, the present invention will be described with an example in which the alignment material is formed on the first substrate on which a thin film transistor array is formed.

The alignment material, like the alignment material of FIG. 1, is a material that is mixed with an alignment base material and a photopolymerizable monomer or oligomer. Here, the alignment base material can include an alignment material of polymer series or a photoalignment material. The alignment material can further include a polymerization initiator.

Next, a liquid crystal layer is formed (S700). The liquid crystal layer can be formed before or after the coupling of the first substrate and the second substrate, and the introducing of the liquid crystal can be performed by the dropping method or the vacuum injecting method. Then, in step S800, an alignment base layer is formed by photoaligning the alignment base material that is included in the alignment material by irradiating the UV-light, and at the same time, an alignment controlling layer is formed by photopolymerizing the photopolymerizable monomer or oligomer.

In an example, the alignment layer is formed by irradiating the UV-light in the first direction onto the first domain of FIG. 1 so as to have a pre-tilt. Here, the alignment layer can include a photoaligned alignment base layer and an alignment controlling layer that includes a plurality of branches extended from the alignment base layer.

In a more detailed example, an alignment layer that has an azimuthal angle in a first direction is formed by irradiating light that is linearly polymerized in the first direction in the first domain of the substrate on which the alignment material is formed, and another alignment layer that has an azimuthal angle in a second direction is formed by irradiating light that is linearly polymerized in the second direction in the second domain.

Furthermore, in a state in which the substrate is tilted at a certain angle, a first alignment layer is formed by irradiating linear polymerized light onto the first domain, and then in a state in which the substrate is tilted at a different angle, a second alignment layer is formed by irradiating linear polymerized light onto the second domain.

Although the present invention is described with an example in which the alignment layer is formed by irradiating light without applying the voltage after the liquid crystal layer is formed, it is also possible that the alignment layer is formed by irradiating light while the voltage is applied.

Although the present embodiment describes the multi-domains as an example with reference to FIG. 14, the present invention is not limited to this example, and it is also possible that a mono-domain liquid crystal display device can be manufactured.

Figure 15:
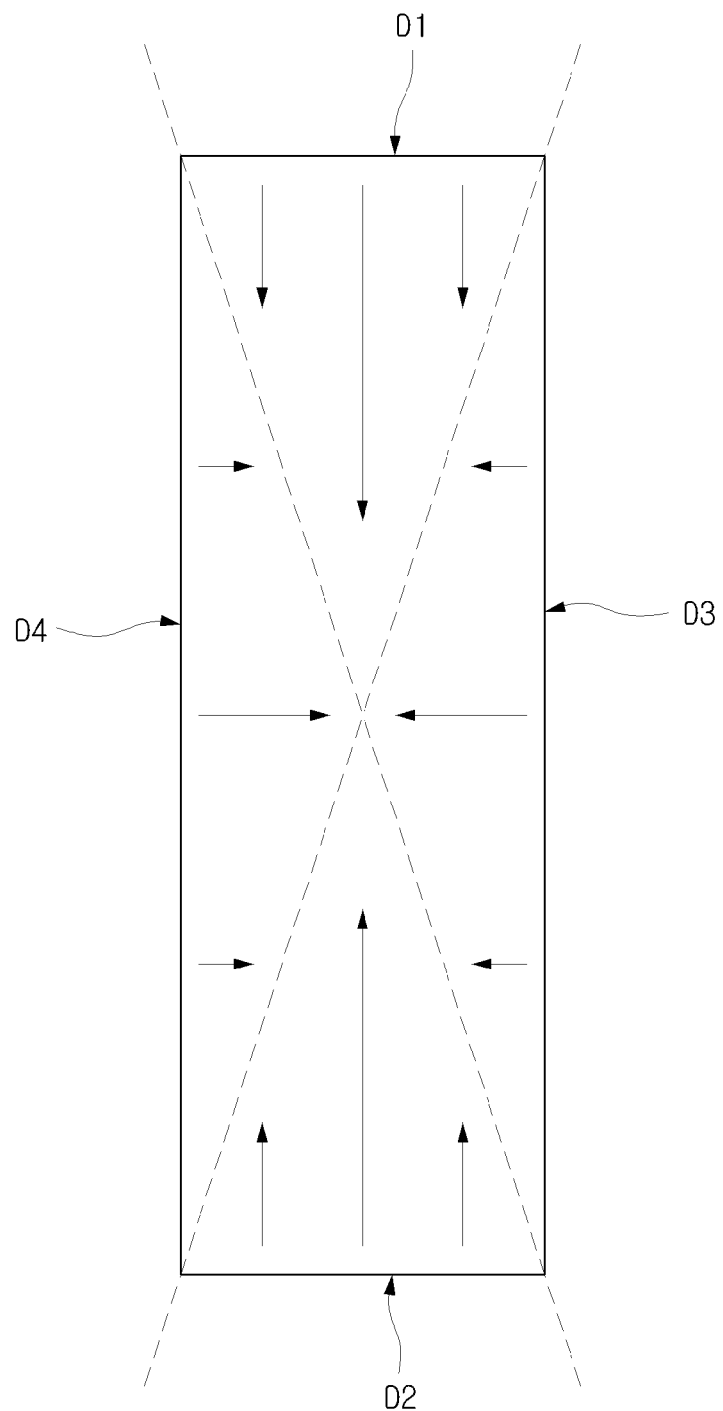
FIGS. 15 and 16 are plan views illustrating the domain form of each pixel of a liquid crystal display device that is manufactured according to any one of the methods of manufacturing a liquid crystal display device described in FIGS. 4 to 14.
Figure 16:
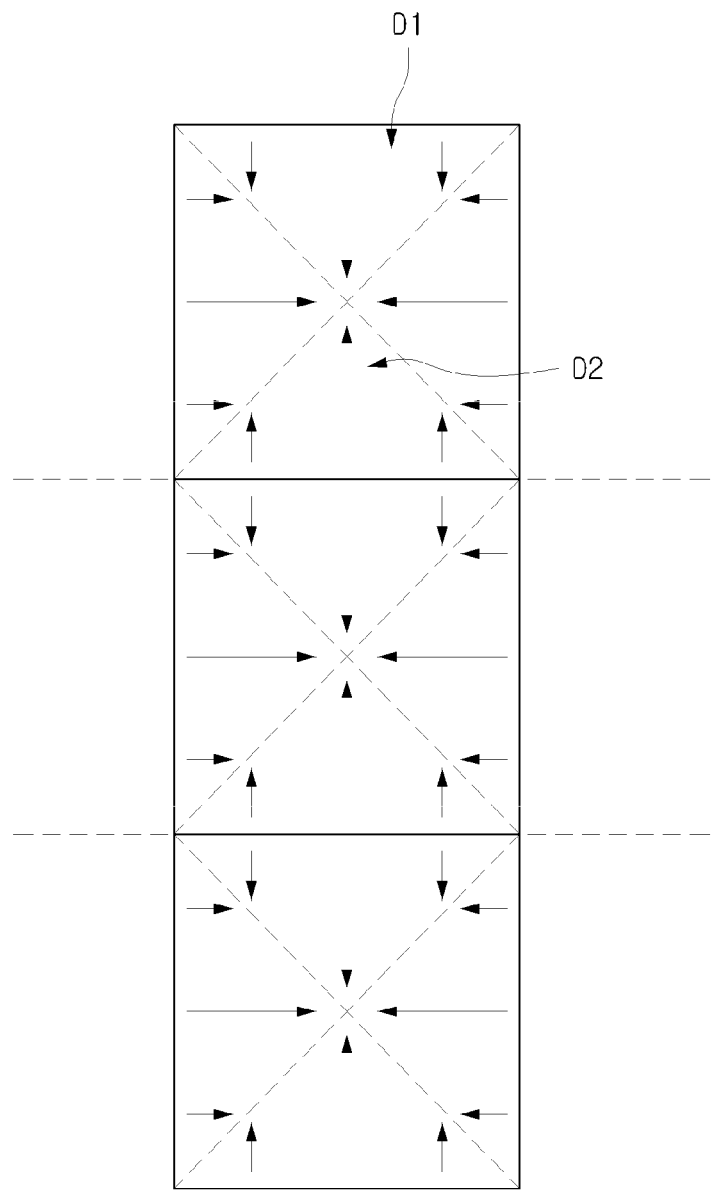

FIGS. 15 and 16 are plan views illustrating domain forms of each pixel of a liquid crystal display device that is manufactured according to any one of the methods for manufacturing a liquid crystal display device illustrated in FIGS. 4 to 14.

FIG. 15 shows a pixel that has four domains. Each domain is divided by the center point of the pixel so as to have a triangular section. Here, the alignment layer that is formed on each domain has a different pre-tilt for each domain. For example, the alignment layers that are formed on a first domain (D1) and a second domain (D2) have azimuthal angles that are symmetrical to each other. Also, the alignment layers that are formed on a third domain (D3) and a fourth domain (D4) have azimuthal angles that are symmetrical to each other. Also, the azimuthal angles of the first domain (D1) and the third domain (D3) are perpendicular to each other. Likewise, the azimuthal angles of the second domain (D2) and the fourth domain (D4) are perpendicular to each other.

Here, the alignment layers formed on the first to fourth domains (D1 to D4) can have a certain polar angle. For example, the alignment layer that is formed on each of the first to fourth domains (D1 to D4) can have a same polar angle or a different polar angle for each domain.

FIG. 16 is a plan view briefly illustrating a pixel that is divided into twelve domains. In FIG. 16, one pixel is first divided into three rectangular-shaped domains, and then each of the three rectangular-shaped domains is divided again into four triangular-shaped domains.

The alignment layer that is formed on a first domain (D1) and a second domain (D2) can include an alignment base layer and an alignment controlling layer that have different azimuthal angles that are symmetrical to each other. As a pair of two domains that are symmetrical to each other, the other domains are arranged in the same way. The alignment layer that is formed on each domain has a symmetrical azimuthal angle. Here, the polar angle can be different for each domain. Here, the azimuthal angle can be formed in four directions, and the domains having a same azimuthal angle can have a different polar angle.

Figure 17:
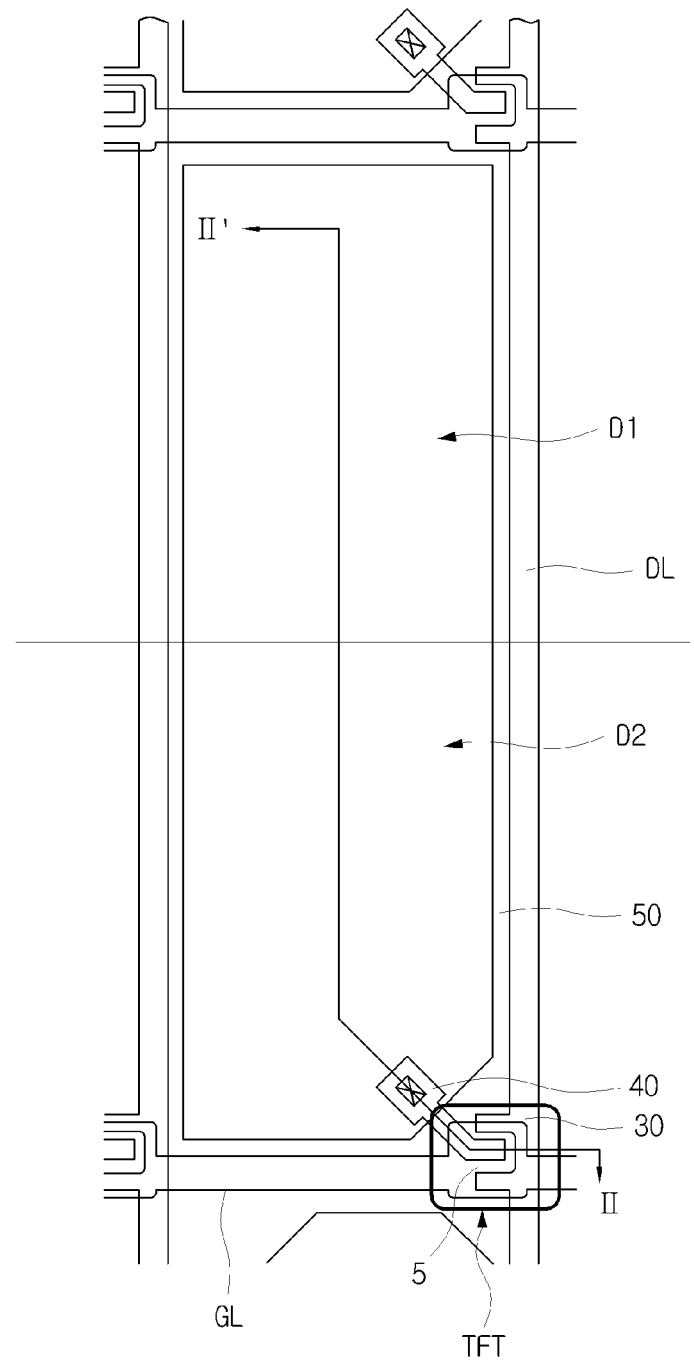
FIG. 17 is a plan view of a liquid crystal display device in accordance with an embodiment of the present invention.
Figure 18:
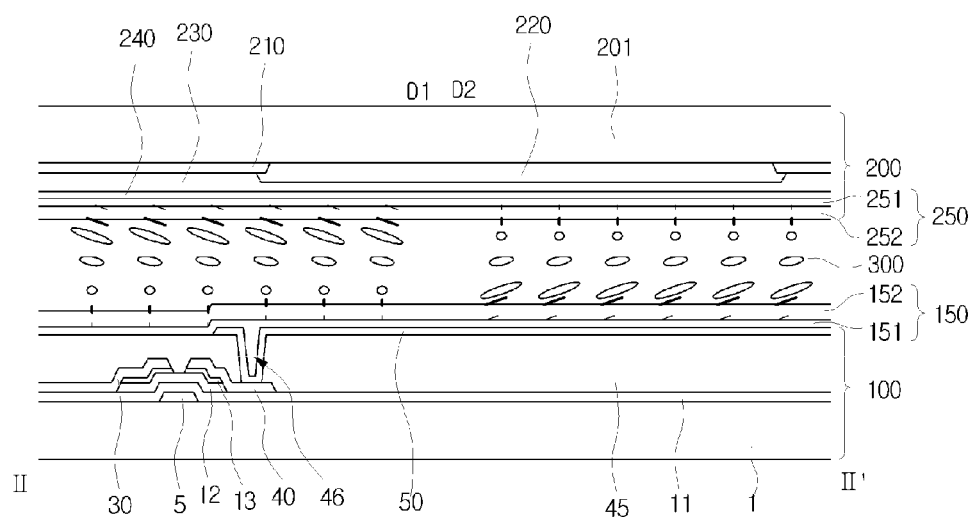
FIG. 18 is an enlarged transverse section II-II' of the liquid crystal display panel shown in FIG. 17.
Figure 19:
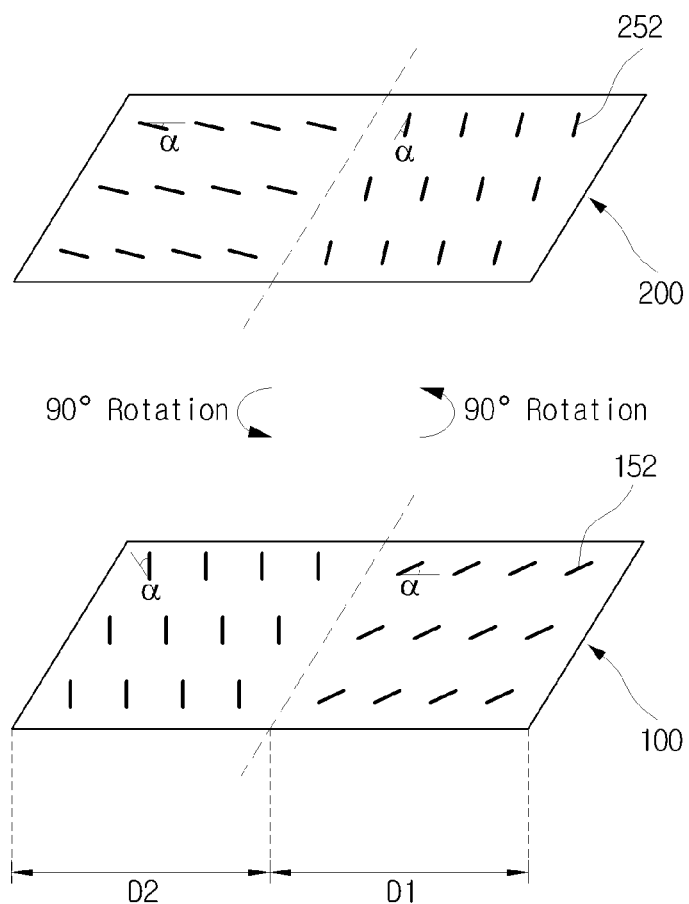
FIG. 19 is a conceptual diagram briefly illustrating the liquid crystal display device shown in FIG. 17.

FIG. 17 is a plan view of a liquid crystal display device according to an embodiment of the present invention, FIG. 18 is an enlarged transverse section II-II' of the liquid crystal display panel shown in FIG. 17, and FIG. 19 is a conceptual diagram briefly illustrating the liquid crystal display device shown in FIG. 17. Referring to FIGS. 17 to 19, the liquid crystal display device according to an embodiment of the present invention includes a first substrate 100, a second substrate 200, and a liquid crystal layer 300. Here, the first substrate 100 is a thin film transistor substrate on which a thin film transistor array is formed, and the second substrate 200 is a color filter substrate on which a color filter array is formed.

In a more detailed example, the first substrate 100 can include a first insulation substrate 1, a gate line (GL), a data line (DL), a thin film transistor (TFT), a pixel electrode 50, and a first alignment layer 150. Since the first substrate 100 is the same as that of the liquid crystal display device of FIG. 1, redundant explanations are omitted.

The first alignment layer 150 is formed on the pixel electrode 50. The first alignment layer 150 includes a first alignment base layer 151 and a first alignment controlling layer 152.

The first alignment base layer 151 can include a material of polymer series or a photoalignment material.

As described with reference to FIG. 1, the first alignment base layer 151 can include a material of polymer series. In a more detailed example, the first alignment base layer 151 can include at least one of a poly-amic acid, a poly-imide, nylon, and PVA (polyvinyl alcohol). The first alignment base layer 151 can also include a material selected from a group consisting of polyimide, polyamic acid, polynorbornene, phenyl-maleimide copolymers, polyvinylcinnamate, polyazobenzene, polyethyleneimine, polyvinyl alcohol, polyamide, polyethylene, polystyrene, polyphenylenephthalamide, polyester, polyurethane, polysiloxanecinnamate, cellulosecinnamate and polymethyl methacrylate. The first alignment base layer 151 is formed by irradiating light at least one time and has a pre-tilt according to the irradiating direction of the light. Here, the pre-tilt of the liquid crystal layer 300 can be determined by the pre-tilt of the first alignment base layer 151. In this way, the alignment stability of the liquid crystal can be improved.

Light such as ultraviolet rays can be used as the light being used in photoalignment, and light that is linear polarized, elliptical polarized, or circular polarized can be used.

The first alignment controlling layer 152 is formed with a plurality of branches extending towards the outside from the first alignment base layer 151 so as to have a pre-tilt.

The first alignment controlling layer 152 is formed by polymerizing a photopolymerizable monomer or oligomer. For example, a reactive mesogen (RM), NOA series manufactured by Norland, Co., Ltd., and the like can be used for the first alignment controlling layer 152.

The second substrate 200 can include a second insulation substrate 201, a black matrix 210, a color filter 220, a flat-shaped layer 230, a common electrode 240, and a second alignment layer 250. Here, since the second insulation substrate 201, the black matrix 210, the color filter 220, the flat-shaped layer 230, and the common electrode 240 of the second substrate 200 are the same as those components of FIG. 1, and thus redundant descriptions are omitted.

The second alignment layer 250 is formed on the common electrode 240. The second alignment layer 250 can include a second alignment base layer 251 and a second alignment controlling layer 252. The second alignment base layer 251 is formed of a polymer material of polymer series or photoalignment material, like the first alignment base layer 151. The second alignment controlling layer 252 is formed by photopolymerizing the photopolymerizable monomer or oligomer, like the first alignment controlling layer 152.

The liquid crystal layer 300 includes liquid crystal having dielectric anisotropy, and the liquid crystal is arranged by the alignment force of the alignment base layers 151 and 152 in a direction that is parallel to the substrates 100 and 200. Then, since a chiral dopant of levorotatory or dextrorotatory is added into the liquid crystal layer 300, the liquid crystal layer 300 is twisted into a spiral shape. However, the present invention is not limited to this embodiment, and it shall be apparent that the chiral dopant may not be added into the liquid crystal layer 300.

As in the example illustrated in FIG. 19, the first alignment controlling layer 152 and the second alignment controlling layer 252 of the first domain (D1) are formed with its azimuthal angles perpendicular to each other. Likewise, the azimuthal angles of the first alignment controlling layer 152 and the second alignment controlling layer 252 in the second domain (D2) are also perpendicular to each other. With this configuration, when the liquid crystal layer 300 is formed between the two substrates 100 and 200, the liquid crystal in the first domain (D1) and the second domain (D2) is aligned, rotating 90 degrees clockwise or counterclockwise.

The change of the azimuthal angle of the second alignment controlling layer 252 may vary according to the mode of the liquid crystal display device. That is, the azimuthal angle of the second alignment controlling layer 252 can be formed anywhere between 0° and 360° from the azimuthal angle of the first alignment controlling layer 152.

Figure 20:
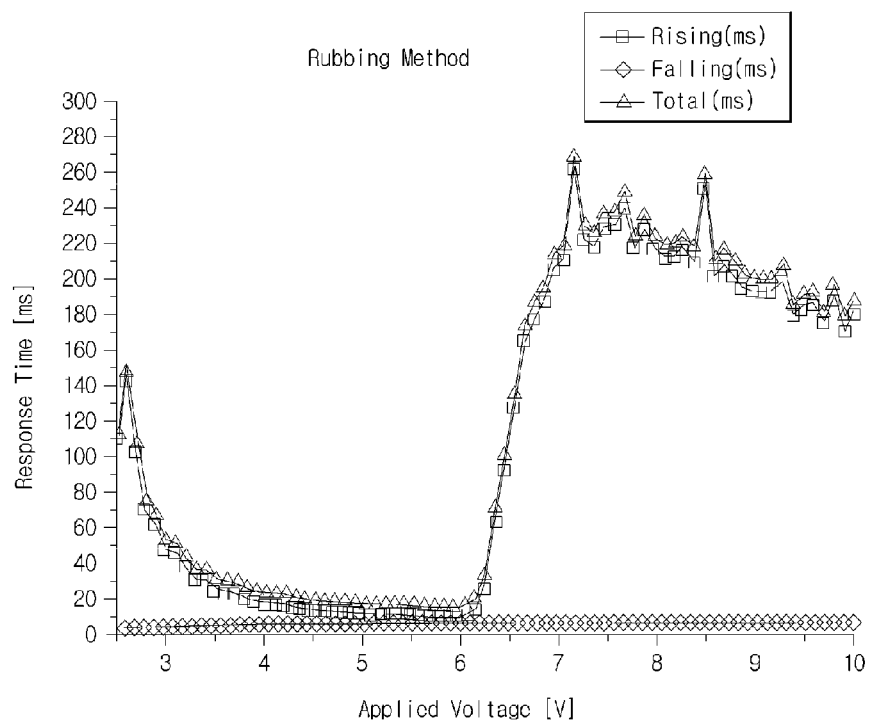
FIG. 20 is a graph illustrating a response speed of liquid crystal of a liquid crystal display device on which an alignment layer is formed by the rubbing method.
Figure 21:
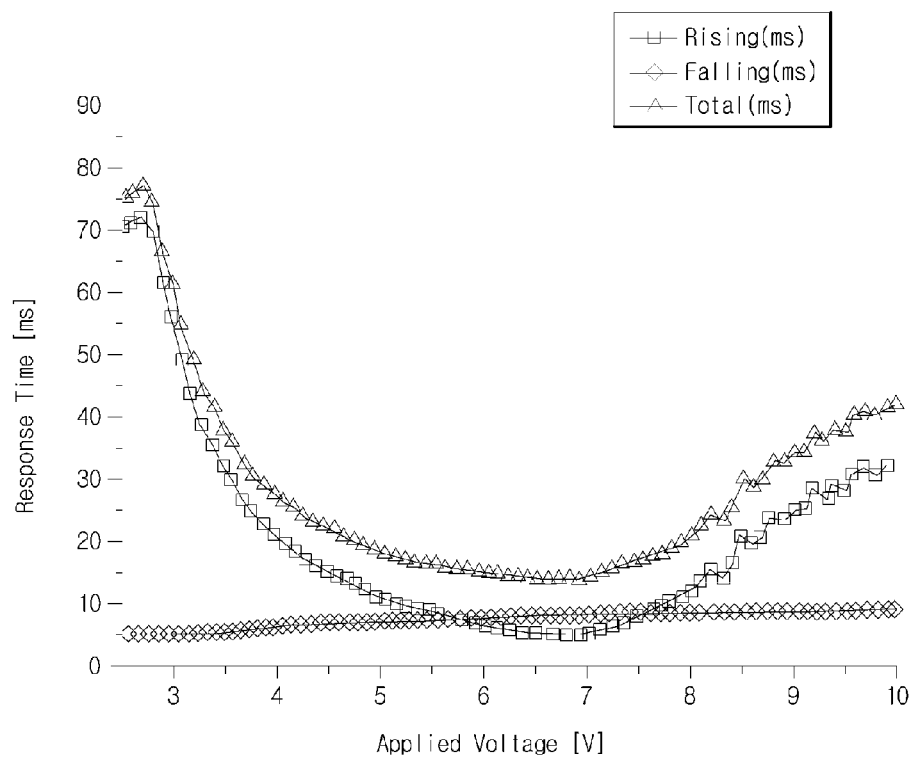
FIG. 21 is a graph illustrating a response speed of liquid crystal of the liquid crystal display device according to an embodiment of the present invention that is illustrated in FIGS. 17 to 19.

FIG. 20 is a graph illustrating a response speed of liquid crystal of a liquid crystal display device on which an alignment layer is formed by the rubbing method, and FIG. 21 is a graph illustrating a response speed of liquid crystal of the liquid crystal display device according to an embodiment of the present invention that is illustrated in FIGS. 17 to 19.

The alignment layer of a mode liquid crystal display device according to an embodiment of the present invention is manufactured in a sequence in which an alignment material that includes a photopolymerizable monomer or oligomer is formed on the first and second substrates, light is irradiated onto the substrate that is tilted at an angle of 30 degrees, a 10V voltage is applied to the first and second electrodes, and then the light is irradiated again for 15 to 30 minutes.

As illustrated in FIGS. 20 and 21, in case the voltage that is applied between the pixel electrode and the common electrode is around 6.5V, the results show that the liquid crystal display device according to an embodiment of the present invention shows a response speed that is similar to the case where the alignment layer is formed by the rubbing method.

As described above, according to an embodiment of the present invention, a response speed of the liquid crystal can be improved without forming a domain dividing means on the pixel electrode, and the viewing angle can be also improved.

Meanwhile, a liquid crystal display device according to an embodiment of the present invention can include a pixel electrode and/or a common electrode on which a domain dividing means is formed.

Figure 22:
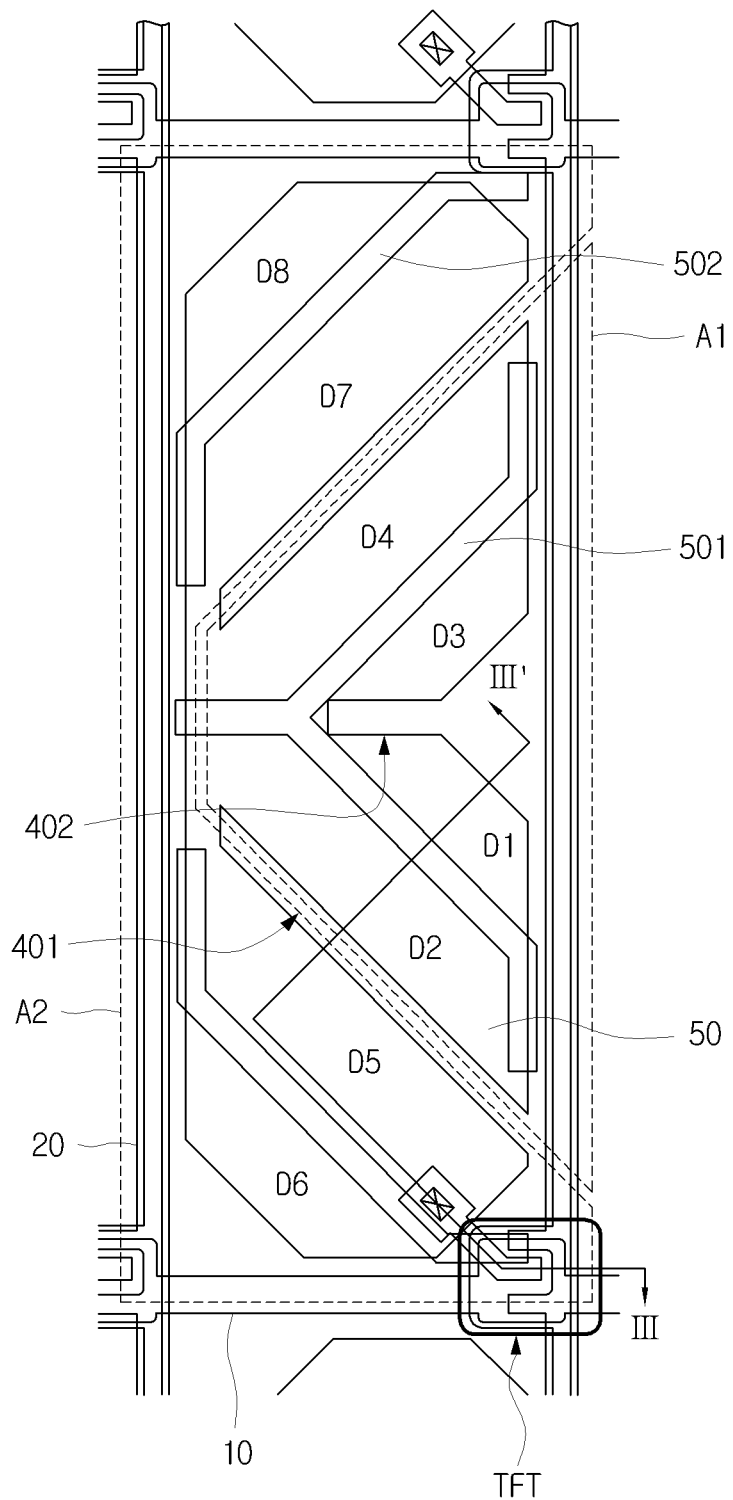
FIG. 22 is a plan view of a PVA liquid crystal display device in accordance with an embodiment of the present invention.
Figure 23:
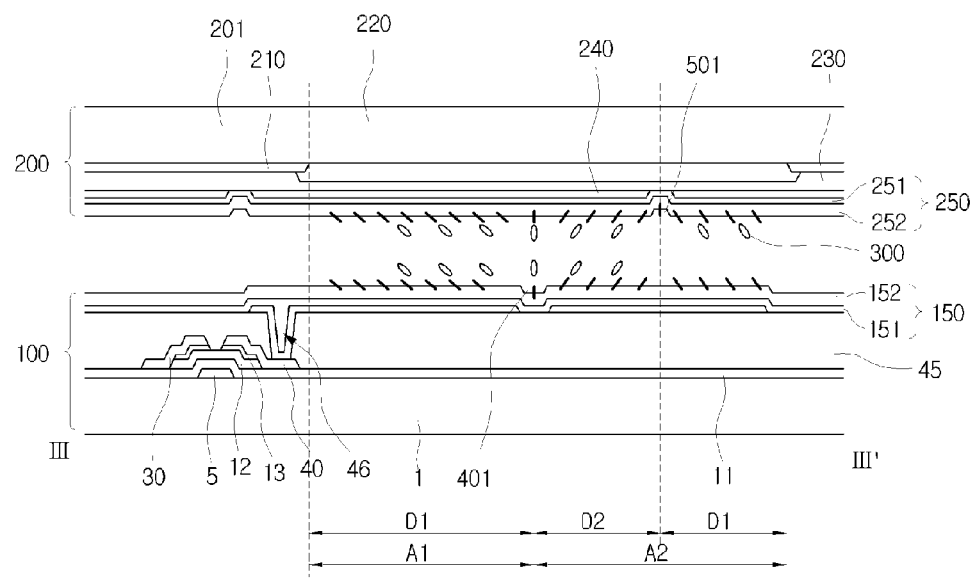
FIG. 23 is an enlarged transverse section III-III' of the liquid crystal display panel shown in FIG. 22.

FIG. 22 is a plan view of a PVA liquid crystal display device according to an embodiment of the present invention, and FIG. 23 is an enlarged transverse section III-III' of the liquid crystal display panel shown in FIG. 22.

Compared to the example illustrated in FIG. 1, the example illustrated in FIGS. 22 and 23 includes the above-described components, excluding that a cutout is formed in the pixel electrode and the common electrode. Thus, reductant explanations will be omitted.

Referring to FIGS. 22 and 23, a liquid crystal display panel according to an embodiment of the present invention includes a thin film transistor substrate 100, a color filter substrate 200, and a liquid crystal layer 300. Here, the liquid crystal layer 300 includes liquid crystal having dielectric anisotropy.

The pixel electrode 50 is connected to a drain electrode 40 of the thin film transistor. A domain dividing means is formed on the pixel electrode 50. As the domain dividing means, a cutout or protrusion can be used.

First cutouts 401 and 402 include a horizontal cutout 402, which is formed horizontally at the place which horizontally divides the pixel electrode 50, and oblique cutouts 401, each of which is formed in an oblique direction in one of the divided pixel electrode 50. Here, the horizontal cutout 402 is formed in a shape in which the horizontal cutout 402 is indented from the right side of the pixel electrode 50 towards the left side thereof and the entrance is widely extended symmetrically.

The pixel electrode 50 is physically symmetrical by the horizontal cutout 402 that is positioned between the top section and the bottom section. Here, the oblique cutouts 401 in the top and bottom sections are perpendicular to one another so that a direction of the fringe field can be spread in four directions.

The color filter substrate 200 includes a common electrode 240 on which a domain dividing means is formed. The domain dividing means formed on the common electrode 240 can be one of the cutout and the protrusion. In FIG. 22, the present invention is described with an example in which second cutouts 501 and 502 are formed as the domain dividing means.

The second cutouts 501 and 502 act as the domain dividing means between the first cutouts 401 and 402. The second cutouts 501 and 502 are formed in an alternating manner with the oblique cutouts 401 of the first cutout. The second cutouts 501 and 502 also include an end part that is overlapped with a side of the pixel electrode 50. Here, the end part can include a vertical end part and a horizontal end part.

As such, the pixel area is divided into a first domain, a second domain, a third domain, and a eighth domain (D1 to D8) through the first and second cutouts 401, 402, 501, and 502.

The first and second alignment layers 150 and 250 formed on each domain can have the same pre-tilt direction as that of the alignment layer described in FIG. 1 or 3. Moreover, the first and second alignment layers 150 and 250 can have the same polar angle as that of the alignment layer described in FIG. 1 or 3. Referring to FIG. 22, the first section (A1) has the first to fourth domains (D1 to D4) formed therein, and the second section (A2) has the fifth to eighth domains (D5 to D8). Here, the first and second alignment layers formed on each of the first to eighth domains (D1 to D8) have a different pre-tilt direction from each other.

Meanwhile, the pre-tilt direction of the first and second alignment layers formed on each of the first to fourth domains (D1 to D4) may be the same as that of the first and second alignment layers formed on each of the fifth to eighth domains (D5 to D8). In an example, both the first and second alignment layers formed on the first domain (D1) and the fifth domain (D5), respectively, can have a same pre-tilt direction. Likewise, the first and second alignment layers, both of which are formed on the second domain (D2) and the sixth domain (D6), on the third domain (D3) and the seventh domain (D7), on the fourth domain (D4) and the eighth domain (D8), respectively, can have a same pre-tilt direction.

Meanwhile, a PVA liquid crystal display device according to an embodiment of the present invention can have a plurality of patterns formed on the pixel electrode, as illustrated in FIGS. 24 to 29. Here, the patterns are for dividing the domains.

Figure 24:
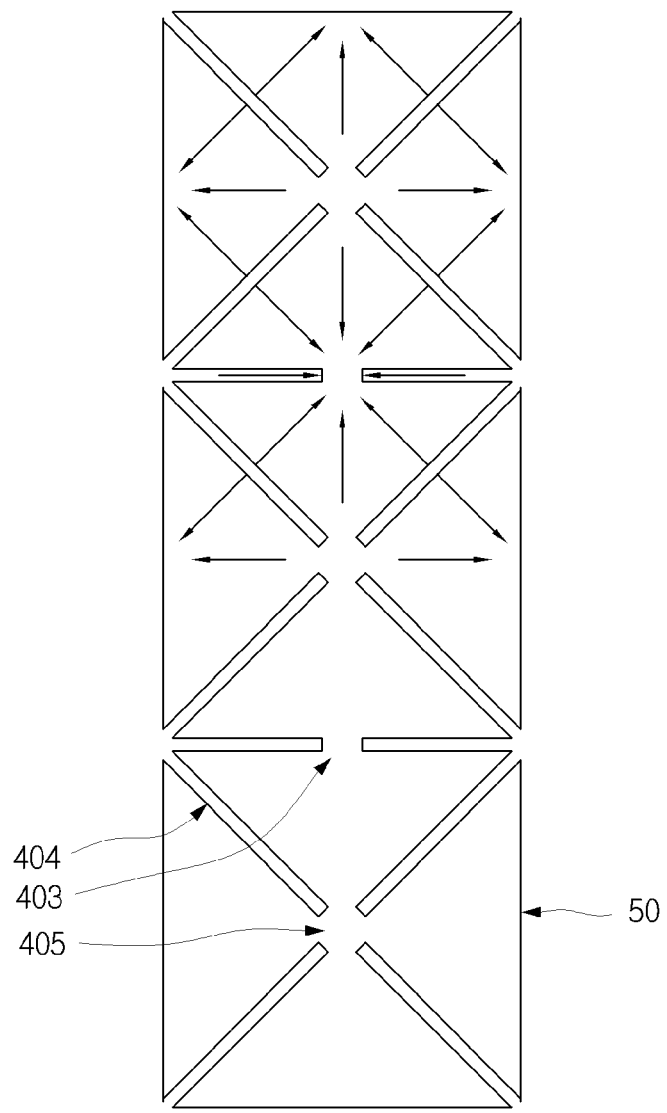
FIGS. 24 to 29 are plan views illustrating various forms of a cutout that is formed in a pixel electrode.
Figure 25:
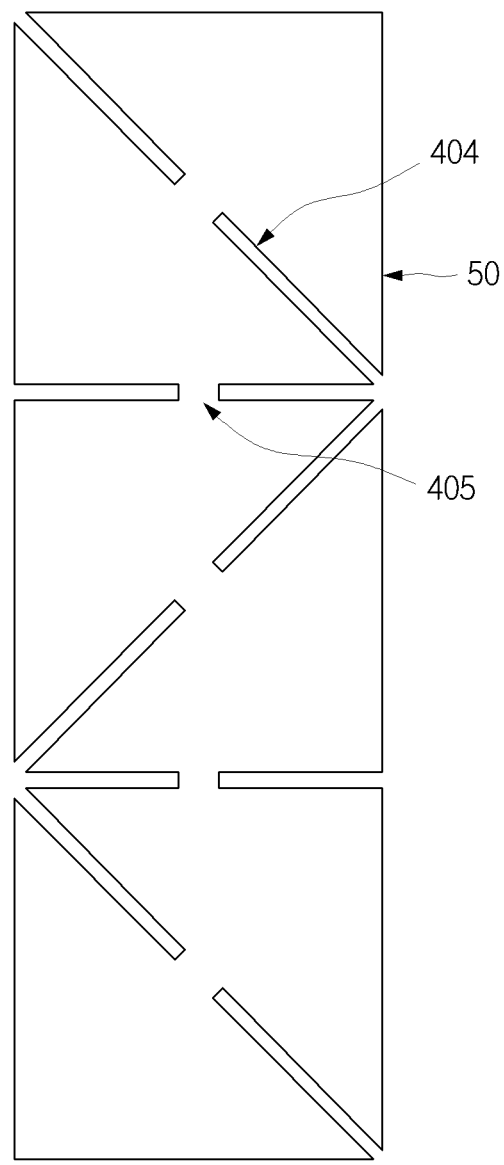
Figure 26:
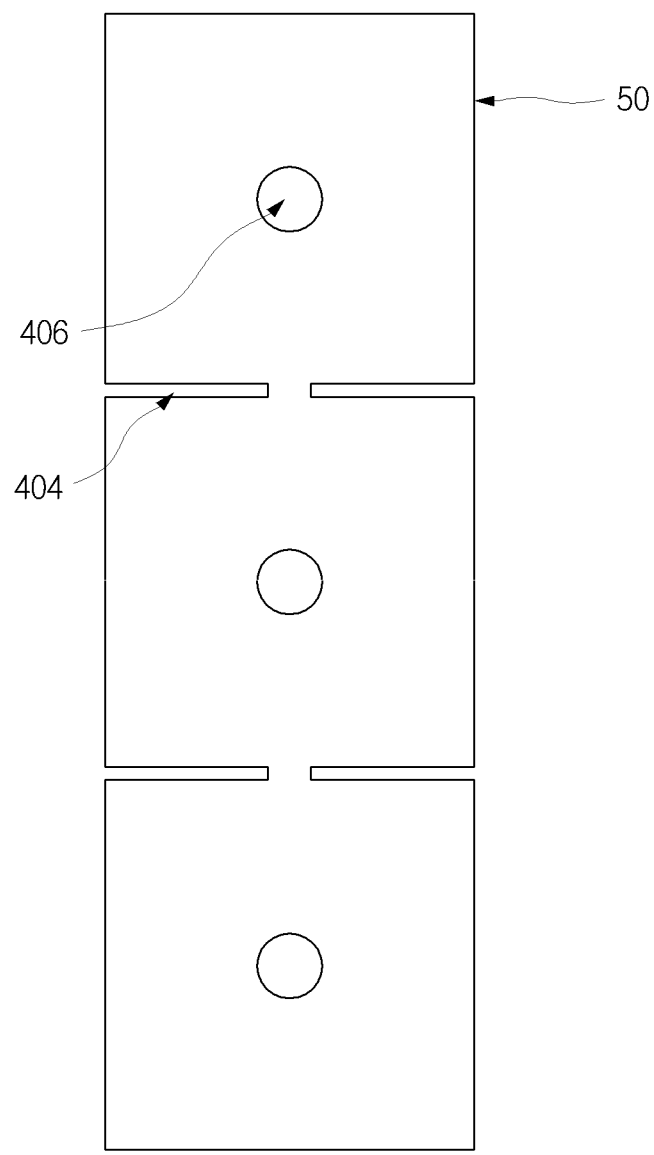
Figure 27:
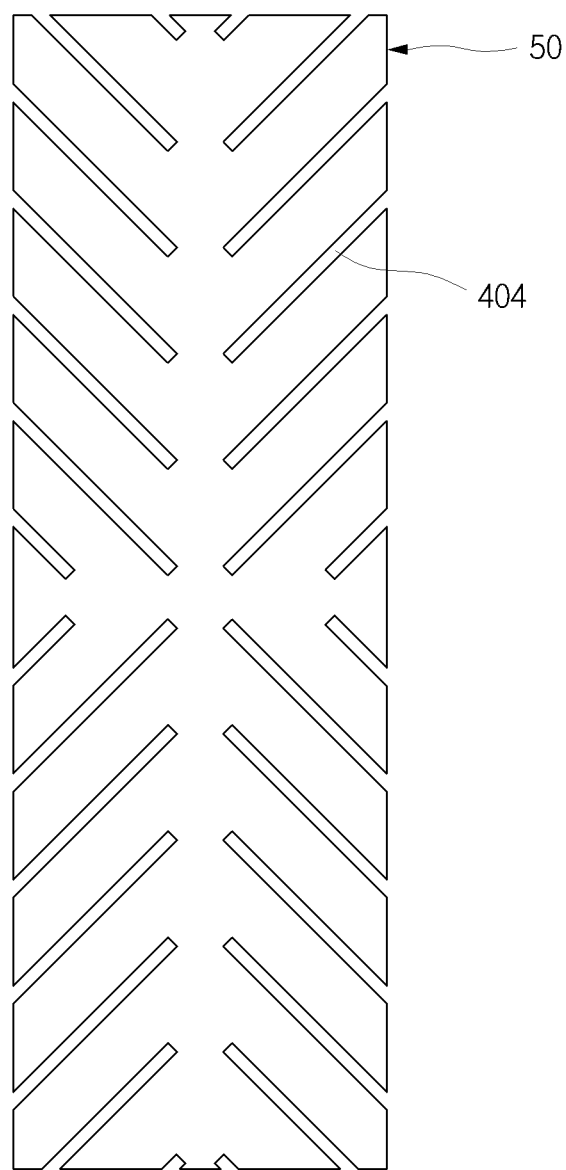
Figure 28:
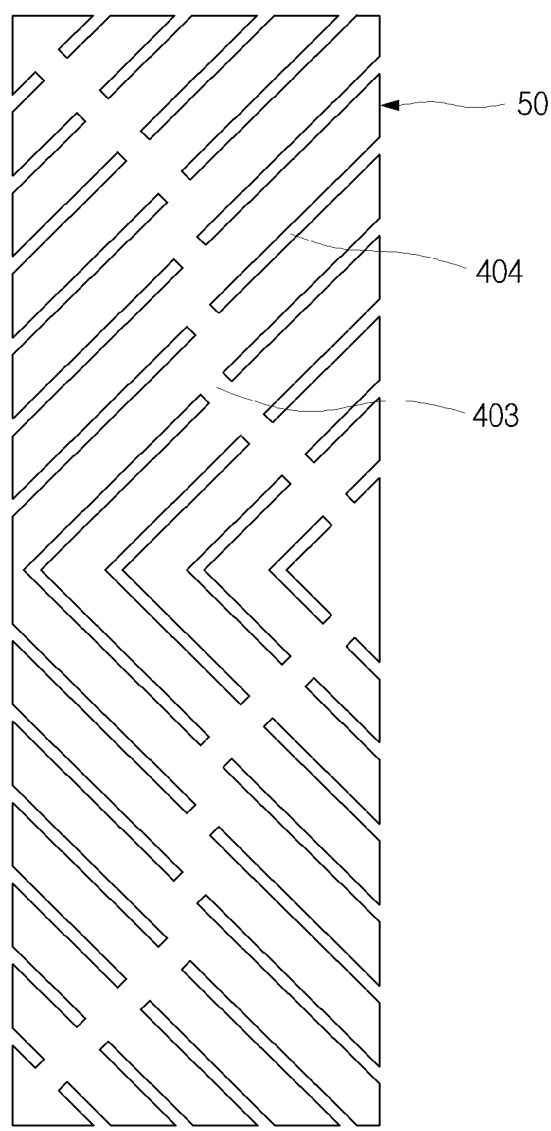
Figure 29:
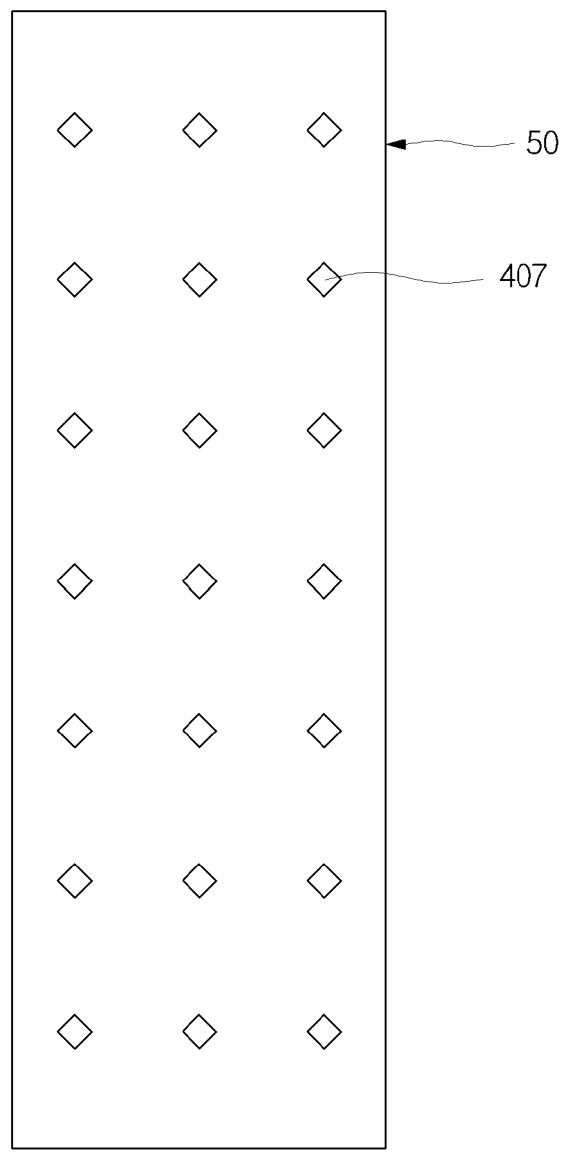

As in the example illustrated in FIG. 24, the pixel electrode 50 can include a plurality of rectangular cutouts 404.

Here, the cutouts 404 divide the pixel electrode 50 into a plurality of triangular sections, and the plurality of triangular sections are connected to one another through connecting units 403 and 405. In a more detailed explanation, the cutouts 404 include a first cutout, which is sloped in a direction from a borderline of the pixel electrode 50, and a second cutout, which is perpendicular to or parallel to the borderline of the pixel electrode 50. The second cutout that is perpendicular to a portion that is parallel to the data line among the borderlines of the pixel electrode 50 divides the pixel electrode 50 into three sections. The first cutout divides each of the three sections divided by the second cutout into four triangular sections. The connecting units 403 and 405 can be changed in various patterns. In an example, the connecting unit 403 and 405 is disposed along the borderline of the pixel electrode 50.

As such, while the cutouts 404 are disposed, the cutouts 404 enable an electric field that is formed when a voltage is applied between the pixel electrode 50 and the common electrode to have a horizontal component, and thus the molecules of the liquid crystal can be arranged by the electric field. In order to arrange the molecules of the liquid crystal, a certain amount of time is required. This is because the liquid crystal molecules perform a two-step operation. That is, the liquid crystal molecules are first arranged in a direction that is perpendicular to the cutouts 404, and then they are arranged again because the previously occurred collision between the molecules is mitigated. In the present embodiment, however, the alignment controlling layer is formed after the liquid crystal molecules are prearranged by the electric field, and thus the alignment controlling layer has a pre-tilt according to the final arrangement state of the liquid crystal molecules. As a result, when the electric field is applied, the liquid crystal molecules do not perform the two-step operation and are immediately in the final arrangement state, thus shortening the response speed of the liquid crystal.

FIGS. 24 to 29 show various forms of a cutout that can be formed in the pixel electrode 50. The liquid crystal display device according to an embodiment of the present invention can include a pixel electrode in which a different form of the cutout is formed.

Although the present invention is described with an example in which a PVA liquid crystal display device having cutouts formed therein is disclosed, it is also possible that a protrusion, rather than the cutout, is formed on any one of the first substrate and the second substrate. That is, a multi-domain liquid crystal display device can be implemented by forming a protrusion, instead of the cutout formed in the example illustrated in FIGS. 24 to 29.

Figure 30:
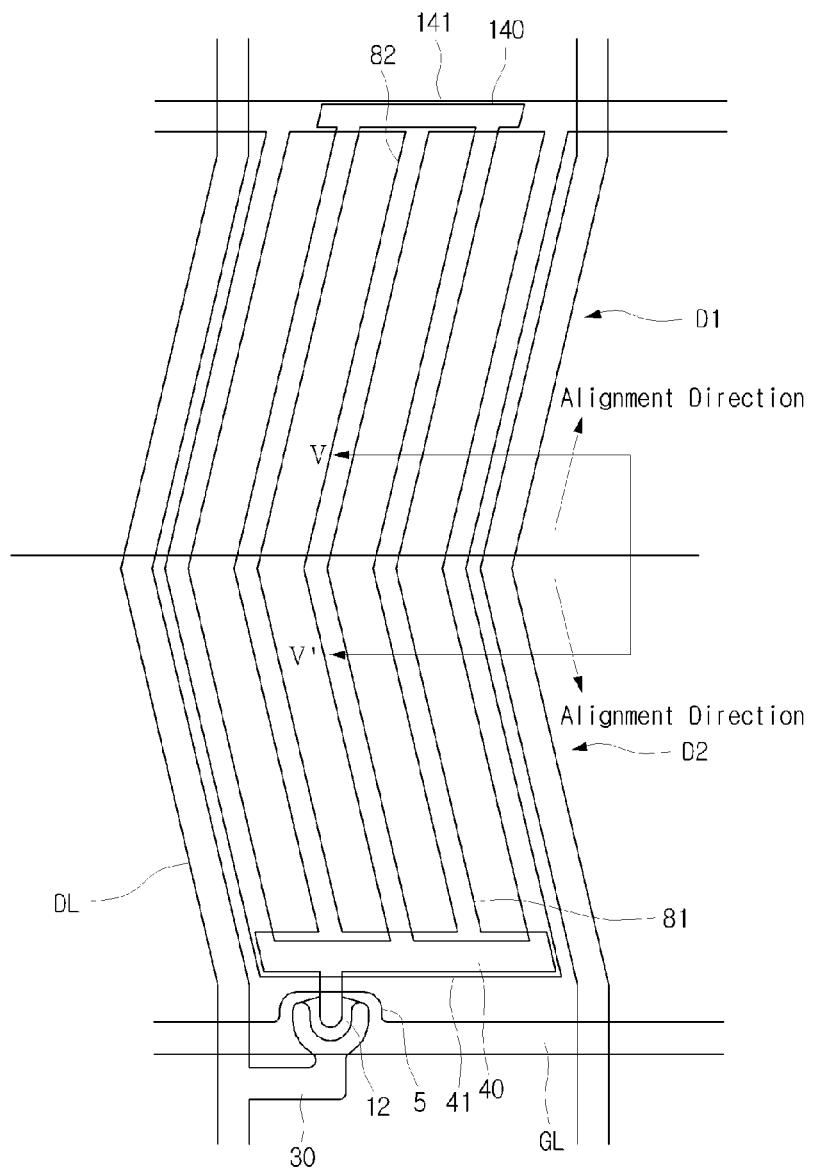
FIG. 30 is a plan view of an IPS (in plane switching) mode liquid crystal display device.
Figure 31:
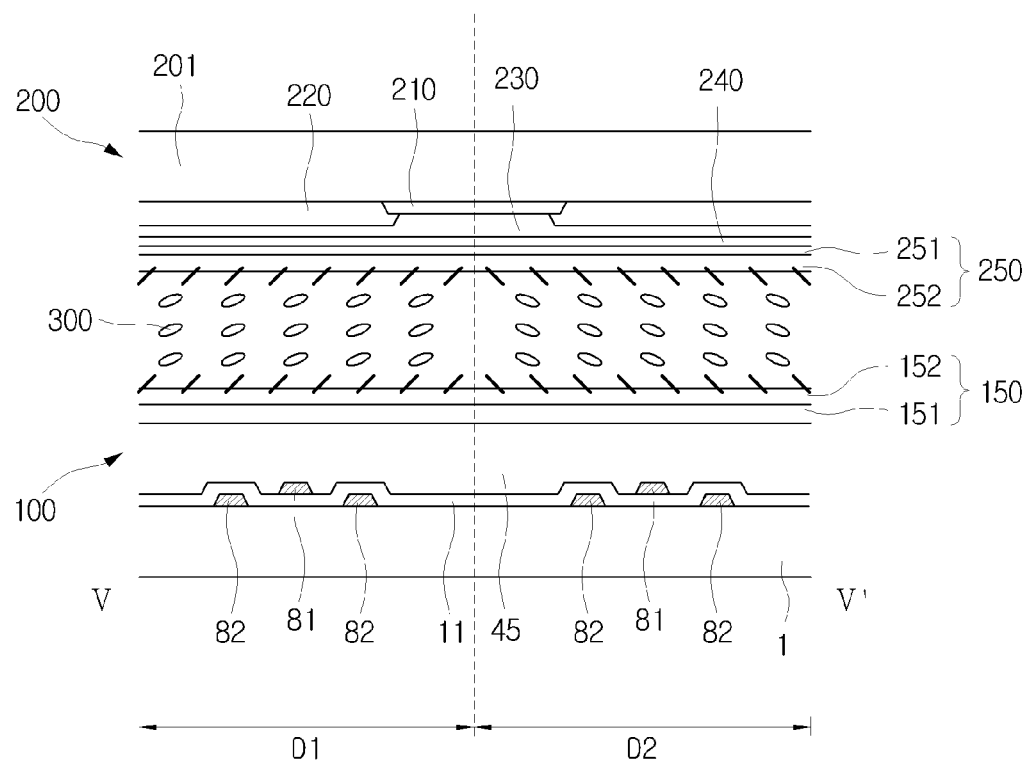
FIG. 31 is an enlarged transverse section V-V' of the liquid crystal display device shown in FIG. 30.

FIG. 30 is a plan view of an IPS (in plane switching) mode liquid crystal display device, and FIG. 31 is an enlarged transverse section V-V' of the liquid crystal display device shown in FIG. 30. The present embodiment is described with an example in which a liquid crystal display device with multi-domains is used as the IPS mode liquid crystal display device.

The IPS mode liquid crystal display device according to an embodiment of the present invention includes a first substrate 100 and a second substrate 200 that faces the first substrate 100. Here, the first substrate 100 includes at least one first linear electrode 81 and at least one second linear electrode 82 that is formed in an alternating manner with the first linear electrode 81. Here, the first linear electrode 81 is connected to a pixel electrode 40, and the second linear electrode 82 is connected to a common electrode 140. The pixel electrode 40 is connected to the first linear electrode 81 through a contact hole and the like. Here, a first alignment layer 150 is formed on the first substrate 100, and a second alignment layer 250 is formed on the second substrate 200. Also, a liquid crystal layer 300 is formed between the first substrate 100 and the second substrate 200. Each alignment layer can have a different pre-tilt, i.e., a different azimuthal angle and a different polar angle. Each alignment layer can also include a photo-aligned alignment base layer and an alignment controlling layer that includes a plurality of branches having a pre-tilt extended from the inside of the alignment base layer. The IPS mode liquid crystal display device according to an embodiment of the present invention can include a plurality of domains. Thus, the liquid crystal has a different arrangement direction for each domain. In a more detailed example, a first domain (D1) and a second domain (D2) are defined as an upper section and a lower section, respectively, by a center line (solid line) that divides the pixel into two sections. As in the example illustrated in FIG. 31, the first alignment layer 150 and the second alignment layer 250 formed on the first domain (D1) are formed so as to have the same pre-tilt from the first substrate 100. That is, in the first domain (D1), the second alignment base layer 251 has the same azimuthal angle as that of the first alignment base layer 151. Also, the second alignment controlling layer 252 has the same azimuthal angle as that of the first alignment controlling layer 152.

The first alignment layer 150 and the second alignment layer 250 of the second domain (D2) have a pre-tilt that is different from those of the first domain (D1). In an example, the alignment layers formed on the first domain and the second domain can have different pre-tilts that are symmetrical to one another from the center line (solid line).

In FIGS. 30 and 31, a liquid crystal display device that has its pixel area horizontally divided into two domains is described as an example. However, it is possible that the pixel area is vertically divided into two domains. Moreover, the IPS mode liquid crystal display device according to an embodiment of the present invention can be formed with four or more domains.

Although the present invention is described with the IPS mode liquid crystal display device as an example, the present invention can be equally applied to a FFS (fringe field switching) mode liquid crystal display device that is similar to the IPS mode liquid crystal display device.

Figure 32:
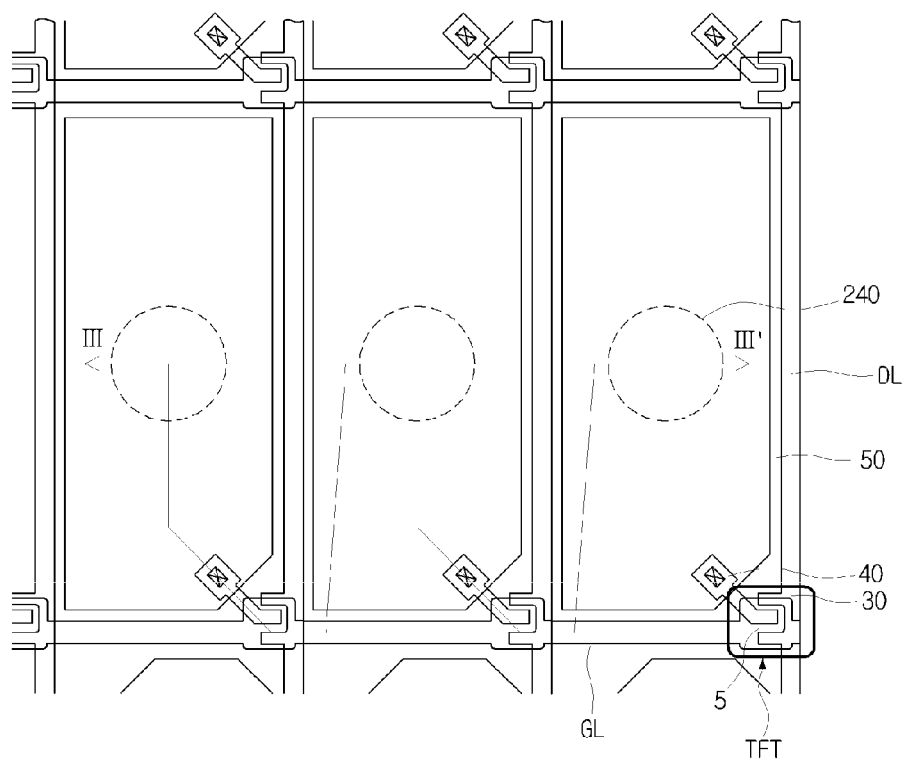
FIG. 32 is a plan view of an ASV (advance super view) liquid crystal display device in accordance with an embodiment of the present invention.
Figure 33:
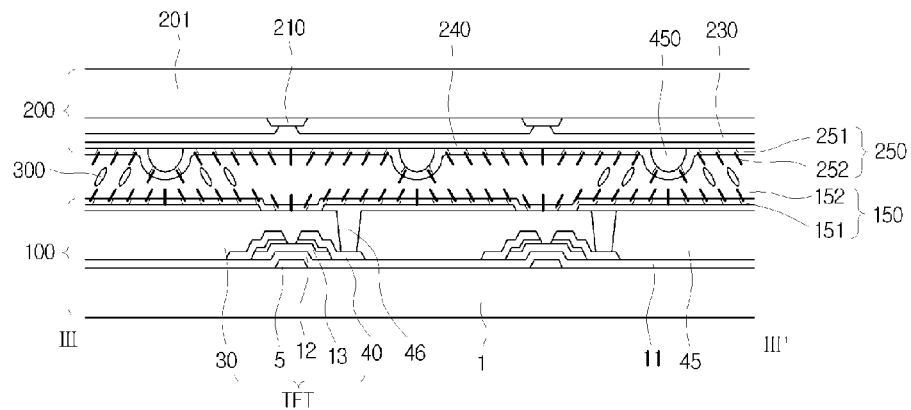
FIG. 33 is an enlarged transverse section III-III' of the liquid crystal display panel shown in FIG. 32.

FIG. 32 is a plan view of an ASV (advance super view) liquid crystal display device in accordance with an embodiment of the present invention, and FIG. 33 is an enlarged transverse section III-III' of the liquid crystal display panel shown in FIG. 32.

Referring to FIGS. 32 and 33, the ASV liquid crystal display device includes a first substrate 100, a second substrate 200, and a liquid crystal layer 300.

In a more detailed example, the first substrate 100 can include a first insulation substrate 1, a thin film transistor (TFT), a pixel electrode 50, and a first alignment layer 150.

Since the first insulation substrate 1, the thin film transistor (TFT), the pixel electrode 50, and the first alignment layer 150 are the same as those components of FIG. 1, redundant descriptions are omitted.

The first alignment layer 150 includes a first alignment base layer 151 and a first alignment controlling layer 152.

The first alignment base layer 151 includes a material of polymer series or a photoalignment material, and can be made of a material selected from the group of materials described in FIG. 1. The first alignment base layer 151 is tilted towards an organic material protrusion 450 of the second substrate 200.

The first alignment controlling layer 152 is formed by photopolymerizing the photopolymerizable monomer or oligomer. Here, the first alignment controlling layer 152 is formed in a direction that is parallel to the organic material protrusion 450 of the second substrate 200.

The second substrate 200 includes a second insulation substrate 201, a black matrix 210, a color filter 220, a flat-shaped layer 230, an organic material protrusion 450, and a common electrode 240. Since the second insulation substrate 201, the black matrix 210, the color filter 220, the flat-shaped layer 230, and the common electrode 240 are the same as those components of FIG. 1, redundant descriptions are omitted.

The organic material protrusion 450 is formed on the flat-shaped layer 230, and at least one organic material protrusion can be formed for each pixel. Here, the organic material protrusion 450 can be formed in the shape of a circle, a square, an oval, and the like.

The common electrode 240 is formed on the flat-shaped layer 230 and the organic material protrusion 450.

The second alignment layer 250 is formed on the common electrode 240. The second alignment layer 250 can include a second alignment base layer 251 and a second alignment controlling layer 252.

The second alignment base layer 251 is made of a material of polymer series or a photoalignment material, and is tilted towards the outside from a protruding area by the organic material protrusion 450. Like the second alignment base layer 251, the second alignment controlling layer 252 is also tilted towards the outside from a protruding area by the organic material protrusion 450.

Here, an initial alignment of the liquid crystal layer 300 is determined by the first alignment layer 150 and the second alignment layer 250.

Although the present invention is described with an example in which one organic material protrusion 450 is formed for each pixel, it is also possible that a plurality of organic material protrusions 450 can be formed.

As in the example illustrated in FIG. 32, the pixel electrode 50 can include a sub-pixel electrode that is divided into several sections. Each sub-pixel electrode can be formed with at least one organic material protrusion 450.

Although the present invention is described with an example in which the organic material protrusion 450 is formed in the center of the pixel electrode 50, it shall be apparent that the present invention is not limited to this example, and it is also possible that a cutout, rather than the protrusion 450, is formed in the pixel electrode 50. Moreover, the present invention can also implement an ASV mode liquid crystal display device by forming a partition wall around the pixel electrode 50.

Figure 34:
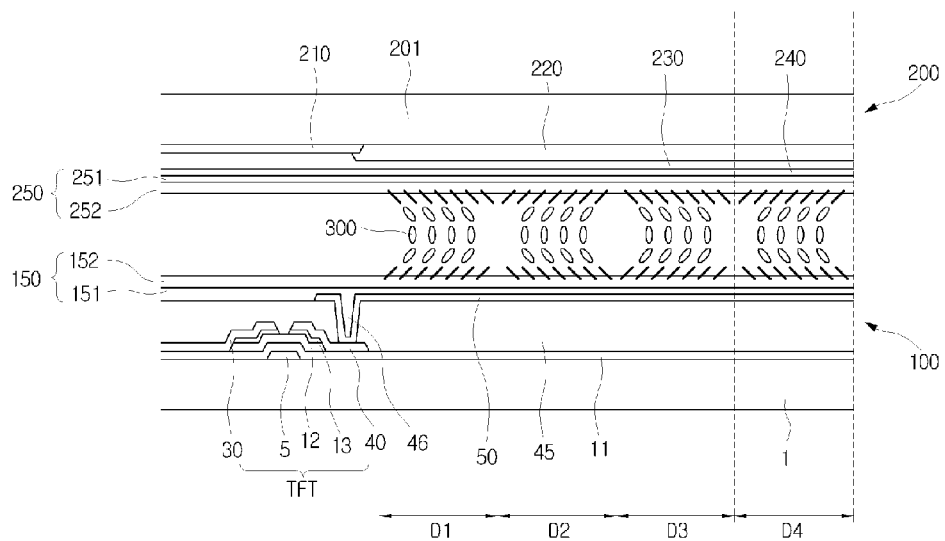
FIG. 34 shows an example of an OCB (optically compensated bend) mode liquid crystal display device in accordance with an embodiment of the present invention.

FIG. 34 shows an embodiment of an OCB (optically compesated bend) mode liquid crystal display device.

Referring to FIG. 34, the OCB mode liquid crystal display device includes a first substrate 100, a second substrate 200, and a liquid crystal layer 300.

In a more detailed example, the first substrate 100 can include a first insulation substrate 1, a gate line (GL), a data line (DL), a thin film transistor (TFT), a pixel electrode 50, and a first alignment layer 150. Since the first insulation substrate 1, the gate line (GL), the data line (DL), the thin film transistor (TFT), and the pixel electrode 50 are the same as those of the liquid crystal display device of FIG. 1, redundant explanations will be omitted.

The first alignment layer 150 includes a first alignment base layer 151 and a first alignment controlling layer 152.

The first alignment base layer 151 includes a first alignment base layer 151 and a first alignment controlling layer 152. The first alignment base layer 151 is formed by photopolymerizing a material of polymer series or a photoalignment material. The first alignment controlling layer 152 is formed by photopolymerizing a photopolymerizable monomer or oligomer.

The second substrate 200 includes a second insulation substrate 201, a black matrix 210, a color filter 220, a flat-shaped layer 230, a common electrode 240, and a second alignment layer 250. Since the second insulation substrate 201, the black matrix 210, the color filter 220, the flat-shaped layer 230, and the common electrode 240 of the second substrate 200 are the same as those components of FIG. 1, redundant descriptions are omitted.

The second substrate 250 includes a second alignment base layer 251 and a second alignment controlling layer 252.

The second alignment base layer 251 is formed by photo-aligning a material of polymer series or a photoalignment material. The second alignment controlling layer 252 is formed by photopolymerizing the photopolymerizable monomer or oligomer.

The second alignment layer 250 that has a pre-tilt different from that of the first alignment layer 150 is formed. For example, the second alignment layer 250 has a direction that is symmetrical to the azimuthal angle of the first alignment layer 150 from the liquid crystal layer 300. For example, the first alignment controlling layer 152 and the second alignment controlling layer 252 have azimuthal angles that are symmetrical to each other from the liquid crystal layer 300. Here, the first alignment controlling layer 152 and the second alignment controlling layer 252 can have the same polar angle. Nevertheless, they can have a different polar angle according to the liquid crystal display device.

As in the example illustrated in FIG. 34, the OCB mode liquid crystal display device according to an embodiment of the present invention can be implemented with multi-domains. That is, each pixel area of the OCB mode liquid crystal display device can be divided into a plurality of domains. Here, the alignment layer formed on the first domain (D1) and the second domain (D2) can have pre-tilts that are different from each other. Also, the alignment layer formed on the third domain (D3) and the fourth domain (D4) can have pre-tilts that are different from each other.

The OCB mode liquid crystal display device illustrated in FIG. 34 can be manufactured through any one of the methods for manufacturing a liquid crystal display device illustrated in FIGS. 4 to 14.

Figure 35:
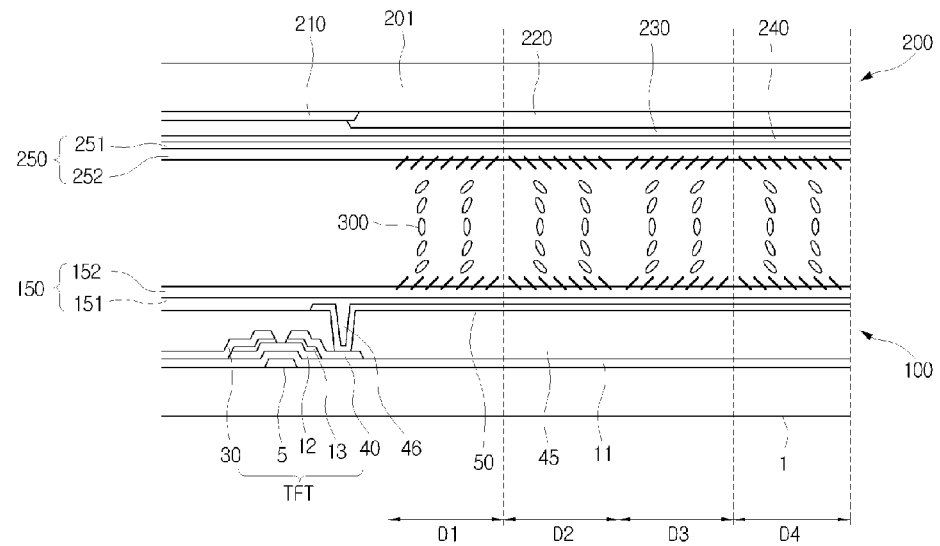
FIG. 35 shows an ECB (electrically controlled birefringence) mode liquid crystal display device.

FIG. 35 shows an ECB (electrically controlled birefringence) mode liquid crystal display device.

Referring to FIG. 35, the ECB mode liquid crystal display device includes a first substrate 100, a second substrate 200, and a liquid crystal layer 300.

A first alignment layer 150 is formed on the first substrate 100, and a second alignment layer 250 is formed on the second substrate 200.

The first substrate 100 is a substrate on which a thin film transistor array is formed, and the second substrate 200 is a substrate on which a color filter array is formed. The first substrate 100 and the second substrate 200 are the same as those of the liquid crystal display device illustrated in FIGS. 1 to 3, and thus reductant explanations will be omitted.

The first alignment layer 150 includes a first alignment base layer 151 and a first alignment controlling layer 152. The first alignment base layer 151 is made of an alignment base material of polymer series or a photoalignment material. The first alignment controlling layer 152 is formed by photopolymerizing the photopolymerizable monomer or oligomer.

The second alignment layer 250 includes a second alignment base layer 251 and a second alignment controlling layer 252. The second alignment base layer 251 is made of an alignment base material of polymer series or a photoalignment material. The second alignment controlling layer 252 is formed by photopolymerizing the photopolymerizable monomer or oligomer.

The detailed description of the components of the first alignment layer 150 and the second alignment layer 250 is the same as that of FIG. 1, and thus reductant explanations will be omitted.

The second alignment layer 250 that has the same pre-tilt as that of the first alignment layer 150 is formed. For example, the second alignment layer 250 has a direction that is parallel to the azimuthal angle of the first alignment layer 150. Here, the first alignment controlling layer 152 and the second alignment controlling layer 252 can have the same polar angle. Nevertheless, they can have a different polar angle according to the liquid crystal display device.

Each of the first alignment controlling layer 152 and the second alignment controlling layer 252 is tilted at a certain angle so as to have a polar angle. The manufacturing of the liquid crystal display device can be performed through any one of the methods for manufacturing a liquid crystal display device illustrated in FIGS. 4 to 14.

In FIG. 35, the first alignment layer 150 and the second alignment layer 250 in the first domain (D1) and the second domain (D2) are formed in a symmetrical direction for each domain. Moreover, the first alignment layer 150 and the second alignment layer 250 in the third domain (D3) and the fourth domain (D4) are formed in a symmetrical direction for each domain.

In FIG. 35, an example of implementing multi-domains is described. However, the present invention is not limited to this example, and it is also possible that a mono-domain can be implemented.

Figure 36:
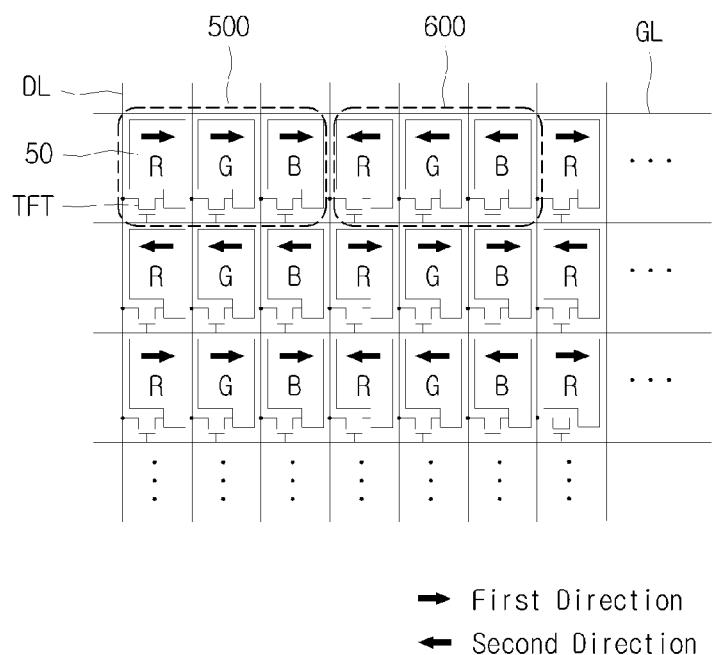
FIG. 36 is a plan view of a liquid crystal display device in accordance with an embodiment of the present invention.
Figure 37:
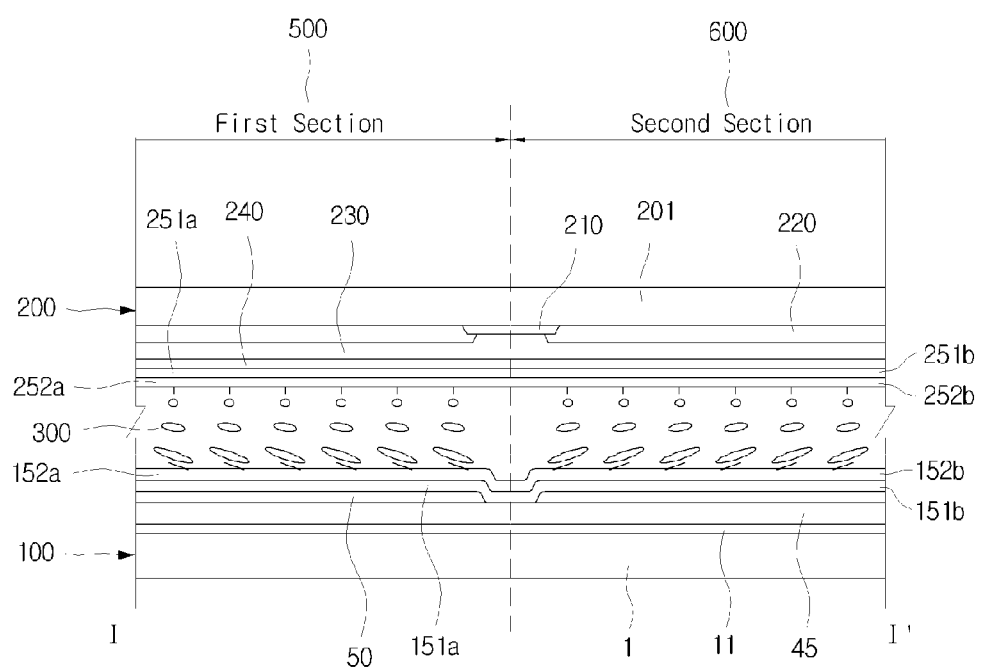
FIGS. 37 and 38 are enlarged transverse sections of the liquid crystal display device shown in FIG. 35.
Figure 38:
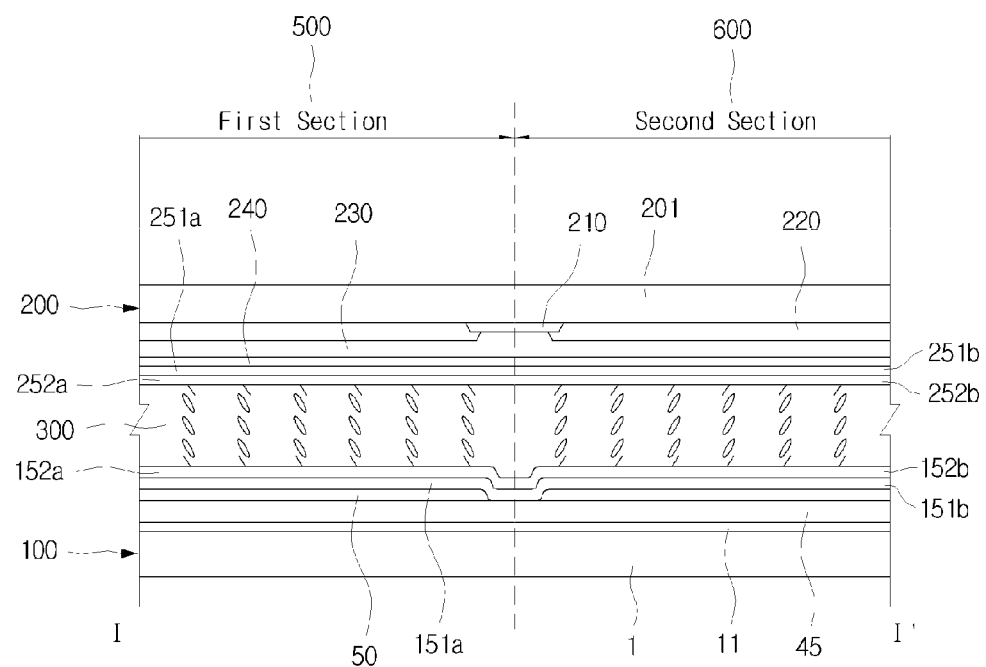

FIG. 36 is a plan view of a liquid crystal display device according to an embodiment of the present invention, and FIGS. 37 and 38 are enlarged transverse sections of the liquid crystal display device shown in FIG. 36.

The liquid crystal display device according to an embodiment of the present invention will be described with a TN mode liquid crystal display device as an example. The example illustrated in FIGS. 35 to 37 has the same components, excluding that the alignment layer has a different pre-tilt for each pixel group, as those of other embodiments. Thus, redundant explanations of the components such as the thin film transistor substrate, the color filter substrate, and the liquid crystal are omitted.

Referring to FIGS. 36 and 37, the liquid crystal display device according to an embodiment of the present invention includes a first pixel group 500 and a second pixel group 600.

The first pixel group 500 includes sub-pixels of red (R), green (G), and blue (B). The second pixel group 600 includes sub-pixels of red (R), green (G), and blue (B) that are in contact with the first pixel group 500. The first pixel group 500 and the second pixel group 600 can be formed in the shape of a mosaic.

The first pixel group 500 includes a first alignment layer and a second alignment layer. The first alignment layer includes a first alignment base layer 151a and a first alignment controlling layer 152a, and the second alignment layer includes a second alignment base layer 251a and a second alignment controlling layer 252a. Here, the first alignment base layer 151a and the first alignment controlling layer 152a are formed on the first substrate 100, and the second alignment base layer 251a and the second alignment controlling layer 252a are formed on the second substrate 200.

The first and second alignment base layers 151a and 251a are made of a material of polymer series or a photoalignment material. The first and second alignment controlling layers 152a and 252a are formed by photopolymerizing the photopolymerizable monomer or oligomer. The composing material of the alignment layer is the same as that of FIG. 1, and thus redundant explanations will be omitted.

In this description, the azimuthal angle of the first alignment controlling layer 152a and the azimuthal angle of the second alignment controlling layer 252a that are formed in the first pixel group 500 are perpendicular to each other, as illustrated in FIG. 37. As in the example illustrated in FIG. 38, the azimuthal angle of the first alignment controlling layer 152a and the azimuthal angle of the second alignment controlling layer 252a are parallel to each other. However, the present invention is not limited to these examples, and the azimuthal angle can be formed anywhere between 0° and 360°. Also, the first alignment controlling layer 152a and the second alignment controlling layer 252a have a polar angle. For example, the polar angle can be determined anywhere between 0° and 180°.

The second pixel group 600 includes third and fourth alignment base layers 151b and 251b and third and fourth alignment controlling layers 152b and 252b. Here, the third alignment base layer 151b and the third alignment controlling layer 152b are formed on the first substrate 100, and the fourth alignment base layer 251b and the fourth alignment controlling layer 252b are formed on the second substrate 200.

The third and fourth alignment base layers 151b and 251b are made of a material of polymer series or a photoalignment material. The third and fourth alignment controlling layers 152b and 252b are formed by photopolymerizing the photopolymerizable monomer or oligomer.

The third alignment controlling layer 152b and the fourth alignment controlling layer 252b can be formed with a different azimuthal angle. As in the example illustrated in FIG. 37, the azimuthal angle of the third alignment controlling layer 152b and the azimuthal angle of the fourth alignment controlling layer 252b are perpendicular to each other. Also, as in the example illustrated in FIG. 38, the azimuthal angle of the third alignment controlling layer 152b and the azimuthal angle of the fourth alignment controlling layer 252b are parallel to each other. However, the present invention is not limited to these examples, and the azimuthal angle of the third alignment controlling layer 152b and the azimuthal angle of the fourth alignment controlling layer 252b can be formed anywhere between 0° and 360°. Also, the polar angle of the third alignment controlling layer 152b and the polar angle of the fourth alignment controlling layer 252b can be formed anywhere between 0° and 180°.

As in the example illustrated in FIG. 38, the alignment layer formed on the first pixel group 500 and the second pixel group 600 has different azimuthal angles that are symmetrical to each other from the adjacent pixel group. Moreover, the alignment layer formed on the first pixel group 500 and the second pixel group 600 may have the same azimuthal angle, but the polar angle thereof can be different from each other.

Figure 39:
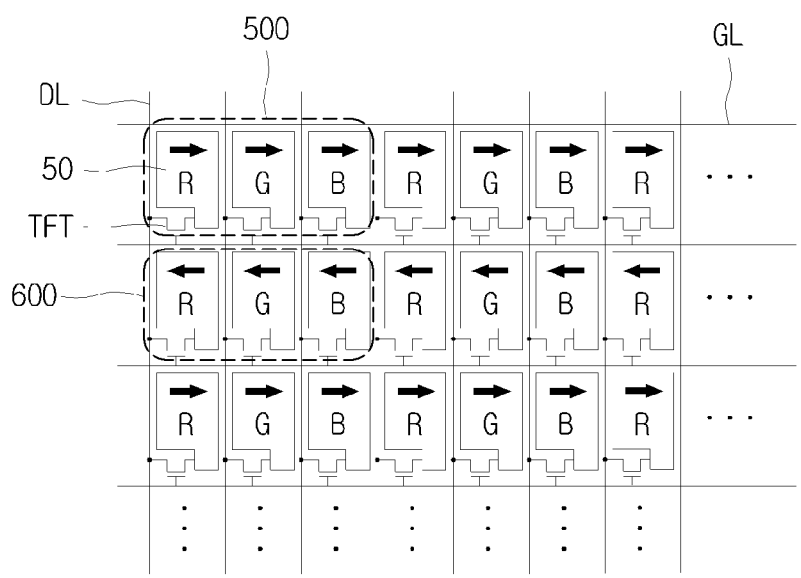
FIGS. 39 and 40 show different examples of the liquid crystal display device shown in FIG. 36.

Compared to the liquid crystal display device illustrated in FIG. 36, the liquid crystal display device illustrated in FIG. 39 includes the above-described components, excluding that the first pixel group 500 and the second pixel group 600 are arranged alternately in a row. That is, the first and second pixel groups 500 and 600 can be formed continuously in the vertical direction.

Figure 40:
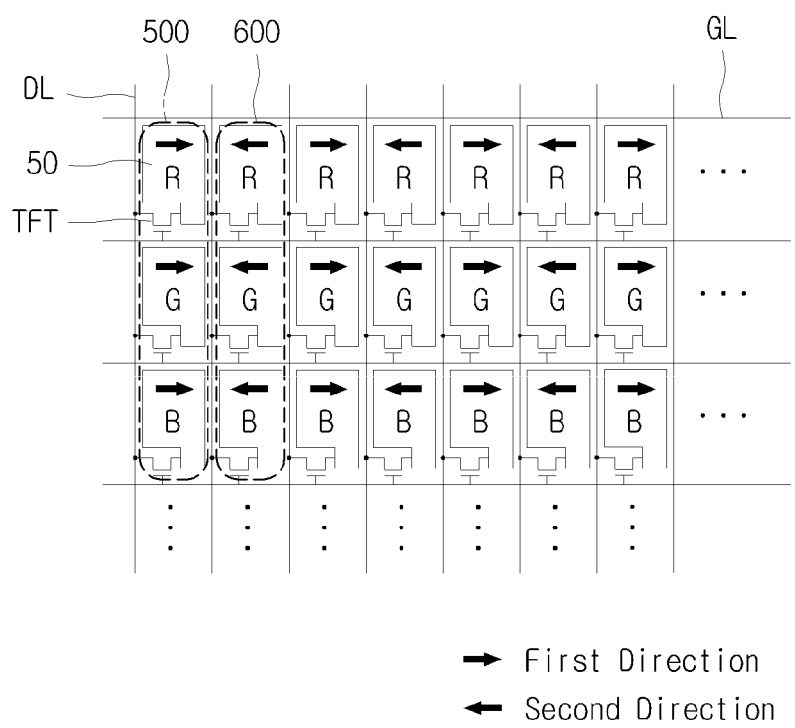

Compared to the liquid crystal display device illustrated in FIG. 36, the liquid crystal display device illustrated in FIG. 40 includes the above-described components, excluding that the first pixel group 500 and the second pixel group 600 are arranged alternately in a column. That is, the first and second pixel groups 500 and 600 can be formed continuously in the horizontal direction.

The present invention is described with an example in which the first pixel group 500 includes three sub-pixels of red (R), green (G), and blue (B) with reference to FIGS. 36 to 40. However, the present invention is not limited to this example, and it is also possible that the first pixel group is constituted by two sub-pixels.

Although it is not illustrated in FIGS. 36 to 40, the first pixel group 500 and the second pixel group 600 can be formed in the shape of a mosaic.

The liquid crystal display device illustrated in FIGS. 36 to 40 can be manufactured according to any one of the methods for manufacturing a liquid crystal display device illustrated in FIGS. 4 to 14.

As the liquid crystal display device illustrated in FIGS. 36 to 40, a TN mode liquid crystal display device or VA mode liquid crystal display device can be used. It is also possible that the liquid crystal display device illustrated in FIGS. 36 to 40 is applied to other mode liquid crystal display devices such as IPS, OCB, ECB, and ASV.

Although the present invention is described with an example in which the above-described alignment material includes the alignment base material and the photopolymerizable monomer or oligomer, it is also possible that the alignment material includes the photopolymerizable monomer or oligomer only. Here, the alignment layer can include the photopolymerizable monomer or oligomer that is polymerized. Here, a pre-tilt of the alignment layer can be controlled by the liquid crystal arrangement, the radiation angle of light (the gradient of the substrate), the polarization direction or polarization state, the radiation intensity of light, and the like according to the material.

Although the present invention is described with an example in which the above-descried liquid crystal layer includes the liquid crystal having dielectric anisotropy, it is also possible that the liquid crystal layer includes the photopolymerizable monomer or oligomer.

While the spirit of the invention has been described in detail with reference to particular embodiments, the embodiments are for illustrative purposes only and shall not limit the invention. It is to be appreciated that those skilled in the art can change or modify the embodiments without departing from the scope and spirit of the invention.

The invention claimed is:

1. A method of manufacturing a liquid crystal display device, comprising:
    (a) forming an alignment material on at least one of a first substrate and a second substrate, a first electrode being formed on the first substrate, the alignment material comprising an alignment base material and a photopolymerizable monomer or oligomer;
    (b) after the forming the alignment material, photoaligning the alignment base material to form an alignment base layer by irradiating primary light onto the at least one of the first substrate and the second substrate;
    (c) applying a voltage between the first electrode and an external electrode or between the first electrode and a second electrode, the second electrode being formed on any one side of the first substrate or the second substrate; and
    (d) after the photoaligning the alignment base material, forming at least one of a first alignment layer and a second alignment layer by irradiating second light onto the at least one of the first substrate and the second substrate,
    wherein the at least one of the first alignment layer and the second alignment layer comprises:
    the alignment base layer that is formed by the photoaligning the alignment base material; and
    an alignment controlling layer that is formed by polymerizing the photopolymerizable monomer or oligomer.

2. The method of claim 1, comprising, after the step of (b), coupling the first substrate and the second substrate to each other.

3. The method of claim 2, comprising, after the coupling of the first substrate and the second substrate, forming a liquid crystal layer between the first substrate and the second substrate.

4. The method of claim 2, comprising, after the step of (d), forming a liquid crystal layer between the first substrate and the second substrate.

5. The method of claim 2, comprising, after the step of (d):
    coupling the first substrate and the second substrate to each other; and
    forming a liquid crystal layer between the first substrate and the second substrate.

6. The method of claim 1, wherein, in the step of (b), the light is linearly polarized, elliptically polarized, or circularly polarized.

7. The method of claim 1, wherein the step (b) is performed by tilting the substrate on which the alignment material is formed at a certain angle.

8. The method of claim 7, wherein the step (b) comprises allowing an azimuthal angle of the first alignment controlling layer to be different for each domain by irradiating separate light having a different polarization direction for each domain.

9. The method of claim 7 or 8, wherein, before the irradiating of the light, the substrate on which the first alignment material is formed is tilted at an angle of at least two separate degrees for each domain.

10. The method of claim 9, wherein the step (b) further comprises covering at least one domain by using a mask.

11. The method of claim 1, wherein the alignment controlling layer is formed by photopolymerizing a reactive mesogen.

12. The method of claim 11, wherein the reactive mesogen is represented by the following formula:

P1-A1-(Z1-A2)$n$-P2, wherein P1 and P2 are independently selected from acrylate, methacrylate, vinyl, vinyloxy, and epoxy groups, A1 and A2 are independently selected from 1,4-phenylene and naphthalene-2,6-diyl groups, Z1 is any one of COO—, OCO—, and single bonds, and n is any one of 0, 1, and 2.

13. The method of claim 1, wherein the alignment material comprises at least one of a poly-amic acid, a poly-imide, nylon, and PVA (polyvinyl alcohol).

14. The method of claim 13, wherein the alignment material comprises a photoalignment material that is reactive to any one of a photocure reaction, a photolysis reaction, a photopolymerization reaction, and a photoisomerization reaction.

15. The method of claim 14, wherein the photoalignment material is made of a polymer material selected from a group consisting of polyimide, polyamic acid, polynorbornene, phenylmaleimide copolymers, polyvinylcinnamate, polyazobenzene, polyethyleneimine, polyvinyl alcohol, polyamide, polyethylene, polystyrene, polyphenylenephthalamide, polyester, polyurethane, and polymethyl methacrylate.

16. The method of claim 1, wherein the alignment material further comprises a polymerization initiator.

17. The method of claim 16, wherein the polymerization initiator comprises any one of methyl ethyl ketone peroxide, benzoyl peroxide, cumene hydroperoxide, t-butyl peroctoate, dicumyl peroxide, benzoyl alkyl ether series, acetoptenone series, benzophenone series, xanthone series, benzoin ether seires, and benzyl ketal series.

18. The method of claim 1, wherein a pre-tilt of the first alignment layer with respect to the first substrate is different from a pre-tilt of the second alignment layer with respect to the first substrate.

* * * * *